(12) United States Patent
Caldato et al.

(10) Patent No.: US 11,681,573 B2
(45) Date of Patent: Jun. 20, 2023

(54) API REGISTRY IN A CONTAINER PLATFORM PROVIDING PROPERTY-BASED API FUNCTIONALITY

(71) Applicant: Oracle International Corporation, Redwood Shores, CA (US)

(72) Inventors: Claudio Caldato, Sammamish, WA (US); Boris Scholl, Kirkland, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 350 days.

(21) Appl. No.: 16/827,090

(22) Filed: Mar. 23, 2020

(65) Prior Publication Data
US 2020/0218589 A1   Jul. 9, 2020

Related U.S. Application Data

(63) Continuation of application No. 16/147,305, filed on Sep. 28, 2018, now Pat. No. 10,599,499.
(Continued)

(51) Int. Cl.
*G06F 9/54* (2006.01)
*G06F 11/36* (2006.01)
(Continued)

(52) U.S. Cl.
CPC .............. *G06F 9/547* (2013.01); *G06F 8/60* (2013.01); *G06F 9/455* (2013.01); *G06F 9/4881* (2013.01);
(Continued)

(58) Field of Classification Search
None
See application file for complete search history.

(56) References Cited

U.S. PATENT DOCUMENTS

| 7,634,759 B2 | 12/2009 | Calsyn et al. |
| 7,698,398 B1 | 4/2010 | Lai |

(Continued)

FOREIGN PATENT DOCUMENTS

| CN | 102681825 | 9/2012 |
| CN | 105917627 | 8/2016 |

(Continued)

OTHER PUBLICATIONS

Clark; Kim, "Microservices, SOA, and APIs: Friends or Enemies?", Tutorial, IBM Developer, Available online at: https://developer.ibm.com/depmodels/cloud/tutorials/1601_clark-trs/#, Jan. 22, 2016, 18 pages.

(Continued)

*Primary Examiner* — Craig C Dorais
(74) *Attorney, Agent, or Firm* — Kilpatrick Townsend & Stockton LLP

(57) ABSTRACT

A method of customizing deployment and operation of services in container environments may include receiving, at an API registry, a property for a service that is or will be encapsulated in a container that is or will be deployed in a container environment. The method may also include determining whether the property for the service affects the deployment of the service to the container environment, and in response to a determination that the property affects the deployment of the service, deploying the service based at least in part on the property. The method may additionally include determining whether the property for the service affects the generation of a client library that calls the service in the container environment, and in response to a determination that the property affects the generation of the client library, generating the client library based at least in part on the property.

20 Claims, 27 Drawing Sheets

Related U.S. Application Data

(60) Provisional application No. 62/566,351, filed on Sep. 30, 2017.

(51) Int. Cl.

| | |
|---|---|
| *G06F 9/455* | (2018.01) |
| *G06F 11/20* | (2006.01) |
| *G06F 9/50* | (2006.01) |
| *G06F 8/60* | (2018.01) |
| *G06F 21/60* | (2013.01) |
| *G06F 9/48* | (2006.01) |
| *H04L 67/10* | (2022.01) |
| *G06F 8/71* | (2018.01) |
| *G06F 3/0482* | (2013.01) |
| *G06F 8/61* | (2018.01) |

(52) U.S. Cl.
CPC ............ *G06F 9/505* (2013.01); *G06F 9/5072* (2013.01); *G06F 9/5083* (2013.01); *G06F 11/203* (2013.01); *G06F 11/362* (2013.01); *G06F 11/3644* (2013.01); *G06F 21/602* (2013.01); *H04L 67/10* (2013.01); *G06F 3/0482* (2013.01); *G06F 8/63* (2013.01); *G06F 8/71* (2013.01); *G06F 9/45558* (2013.01); *G06F 2009/45562* (2013.01)

(56) References Cited

U.S. PATENT DOCUMENTS

| | | | |
|---|---|---|---|
| 7,702,779 B1 | 4/2010 | Gupta et al. | |
| 7,822,826 B1* | 10/2010 | Savchenko | G06F 8/61 |
| | | | 709/219 |
| 8,346,929 B1 | 1/2013 | Lai | |
| 8,352,801 B2 | 1/2013 | Van Der Merwe et al. | |
| 8,479,211 B1 | 7/2013 | Marshall et al. | |
| 8,701,128 B2 | 4/2014 | Salt et al. | |
| 8,707,171 B2 | 4/2014 | Clark et al. | |
| 8,825,550 B2 | 9/2014 | Marr et al. | |
| 9,009,181 B2 | 4/2015 | Smith et al. | |
| 9,201,759 B2 | 12/2015 | Wintergerst et al. | |
| 9,201,762 B1 | 12/2015 | Chen | |
| 9,246,987 B2 | 1/2016 | Smithson | |
| 9,270,553 B1 | 2/2016 | Higgins | |
| 9,274,848 B2 | 3/2016 | Dawson et al. | |
| 9,319,857 B2 | 4/2016 | Cooke et al. | |
| 9,397,909 B2 | 7/2016 | Gabrielson et al. | |
| 9,459,924 B2 | 10/2016 | Bailey et al. | |
| 9,483,312 B2 | 11/2016 | Bailey et al. | |
| 9,632,914 B2 | 4/2017 | Cheng et al. | |
| 9,727,374 B2 | 8/2017 | Ghosh et al. | |
| 9,942,354 B1 | 4/2018 | Thompson et al. | |
| 10,225,140 B2 | 3/2019 | Subramani Nadar et al. | |
| 10,356,214 B2 | 7/2019 | Joshi et al. | |
| 10,489,215 B1 | 11/2019 | Wen et al. | |
| 10,521,246 B1 | 12/2019 | Jain et al. | |
| 10,574,584 B1 | 2/2020 | Young | |
| 10,599,499 B2 | 3/2020 | Caldato et al. | |
| 10,599,500 B2 | 3/2020 | Caldato et al. | |
| 10,824,489 B2 | 11/2020 | Caldato et al. | |
| 10,838,788 B2 | 11/2020 | Caldato et al. | |
| 11,132,241 B2 | 9/2021 | Caldato et al. | |
| 11,343,352 B1 | 5/2022 | Golden et al. | |
| 2002/0120685 A1 | 8/2002 | Srivastava et al. | |
| 2003/0204645 A1 | 10/2003 | Sharma et al. | |
| 2004/0205101 A1 | 10/2004 | Radhakrishnan | |
| 2005/0193264 A1 | 9/2005 | Khan et al. | |
| 2005/0278338 A1 | 12/2005 | Todorova et al. | |
| 2012/0209968 A1 | 8/2012 | Lawson et al. | |
| 2012/0271949 A1 | 10/2012 | Radhakrishnan et al. | |
| 2014/0201218 A1 | 7/2014 | Catalano et al. | |
| 2014/0324196 A1 | 10/2014 | Burr et al. | |
| 2015/0039770 A1 | 2/2015 | Manglik et al. | |
| 2015/0269257 A1 | 9/2015 | Edlund et al. | |
| 2016/0092344 A1* | 3/2016 | Bally | H04L 67/10 |
| | | | 717/124 |
| 2016/0205518 A1 | 7/2016 | Patel et al. | |
| 2016/0217050 A1 | 7/2016 | Grimm et al. | |
| 2016/0301739 A1 | 10/2016 | Thompson | |
| 2016/0337317 A1 | 11/2016 | Hwang et al. | |
| 2016/0378527 A1 | 12/2016 | Zamir | |
| 2017/0046146 A1 | 2/2017 | Jamjoom et al. | |
| 2017/0052771 A1 | 2/2017 | Chen et al. | |
| 2017/0104641 A1 | 4/2017 | Bradshaw et al. | |
| 2017/0147319 A1 | 5/2017 | Riek et al. | |
| 2017/0177860 A1 | 6/2017 | Suarez et al. | |
| 2017/0180346 A1* | 6/2017 | Suarez | G06F 21/53 |
| 2017/0199770 A1 | 7/2017 | Peteva et al. | |
| 2017/0206073 A1 | 7/2017 | Kirkpatrick et al. | |
| 2017/0220451 A1 | 8/2017 | Mankovskii | |
| 2017/0222946 A1 | 8/2017 | Ben Dayan et al. | |
| 2017/0223117 A1 | 8/2017 | Messerli et al. | |
| 2017/0250853 A1 | 8/2017 | Evans | |
| 2017/0257424 A1 | 9/2017 | Neogi et al. | |
| 2018/0075152 A1 | 3/2018 | Zhang | |
| 2018/0121327 A1 | 5/2018 | Grebenschikov | |
| 2018/0165177 A1 | 6/2018 | Gupta et al. | |
| 2018/0198845 A1 | 7/2018 | Kulp et al. | |
| 2018/0205759 A1 | 7/2018 | Hosie et al. | |
| 2018/0288740 A1 | 10/2018 | Ansari | |
| 2018/0309630 A1 | 10/2018 | Zhao et al. | |

FOREIGN PATENT DOCUMENTS

| | | |
|---|---|---|
| CN | 106603594 | 4/2017 |
| JP | 2006508445 | 3/2006 |
| JP | 2006146434 A | 6/2006 |
| JP | 2013541069 | 11/2013 |
| JP | 2014530415 | 11/2014 |
| JP | 2015225524 | 12/2015 |
| JP | 2017037403 | 2/2017 |
| JP | 2017525232 A | 8/2017 |
| JP | 2017174158 | 9/2017 |
| WO | 2011010909 | 1/2011 |
| WO | 2014145777 | 9/2014 |
| WO | 2015197564 | 12/2015 |
| WO | 2016077367 | 5/2016 |
| WO | 2016191639 A1 | 12/2016 |
| WO | 2017084276 | 5/2017 |
| WO | 2017165713 A1 | 9/2017 |

OTHER PUBLICATIONS

U.S. Appl. No. 16/147,332, Non-Final Office Action dated Apr. 2, 2021, 36 pages.
Connecting Mobile Developers to the Cloud with Google Cloud Endpoints, Google Cloud Platform Blog, Nov. 11, 2013, 9 pages.
European Application No. 18793087.0, Office Action dated Nov. 23, 2021, 7 pages.
European Application No. 18793725.5, Office Action dated Nov. 23, 2021, 6 pages.
European Application No. 18795839.2, Office Action dated Dec. 10, 2021, 9 pages.
U.S. Appl. No. 16/147,332, Non-Final Office Action dated Jan. 24, 2022, 39 pages.
U.S. Appl. No. 16/147,343, Notice of Allowance dated Jul. 16, 2020, 9 pages.
U.S. Appl. No. 16/826,629, Notice of Allowance dated May 28, 2021, 10 pages.
"Building Backend Applications with Google App Engine", Google Cloud Endpoints, and Android Studio, 3 Pillar Global, Available online at: https://www.3pillarglobal.com/insights/building-backend-applications-with-google-app-engine-google-cloud-endpoints-and-android-studio, Jan. 15, 2018, 14 pages.
"Cloud Endpoints, Develop, Deploy and Manage APIs on any Google Cloud Backend", Cloud Endpoints-API Management, Google Cloud Platform, Available online at: https://cloud.google.com/endpoints/, Jan. 11, 2018, 5 pages.
"Computer Resources", Red Hat Openshift, retrieved online at: https://docs.openshift.com/enterprise/3.1/dev_guide/compute_resources.html, Jun. 20, 2016, pp. 1-3.

(56) References Cited

OTHER PUBLICATIONS

"Connect and Communicate with Services in Service Fabric", retrieved online at: https://github.com/MicrosoftDocs/azuredocs/blob/9f71dca2fb2b95fc34c15ebdabe37199b81dd40/articles/service-fabric/servicefabric-connect-and-communicate-with-services.md, Aug. 23, 2017, 7 pages.
"Containers Live Migration Behind the Scene", Jelastic, Available Online at: https://vdocuments.mx/jelastic-containers-live-migration-behind-the-scene.html, Apr. 16, 2017, 18 pages.
"Debug a Live App Using Console App", APCERA Documentation, retrieved Jan. 15, 2018, 1 page.
"Handling Out of Resource Errors", Red Hat Openshift, Available Online at: https://docs.openshift.com/container-platfomi/3.6/admin_guide/out_of_resource_handling.html, Jun. 27, 2017, pp. 1-8.
"Service Registry", retrieved from https://help.sap.com/saphelp_nw73/helpdata/en/D9/0F7E2C1C644992A195D38CFEC1B1F2/frameset.htm, Jan. 9, 2018, 3 pages.
Swagger (Open API) Specification Code Generator Featuring C# and Razor Templates, Supports C#, Java, Node.js, Typescript, Python and Ruby, Auto Rest, Available Online at: https://github.com/Azure/autorest, Jun. 4, 2017, 4 pages.
Abeysinghe; Asanka, "API Registry and Service Registry", The Source, WSO2 Blogs, Available Online at: http://wso2.com/blogs/thesource, Jul. 24, 2014, 4 pages.
Arora et al., "Setting Budgets for Live Debugging", Columbia University Computer Science Technical Reports, CUCS-013-15, Aug. 28, 2015, 13 pages.
Casey, Microservices and Containers: 6 Things to Know at Start Time, The Enterprisers Project, Available Online At: https://enterprisersproject.com/article/2017/9/microservices-and-containers-6-things-know-start-time, Sep. 13, 2017, 8 pages.
Cutulescu; Gratian, "Building Backend Applications With Google App Engine, Google Cloud Endpoints, and Android Studio", 3 Pillar Global, https://www.3pillarglobal.com/insights/building-backend-applications-with-google-app-engine-google-cloudendpoints-and-android-studio, retrieved Jan. 15, 2018, all pages.
Gutierrez et al., "Real-Time Debugging in Production with Bluemix Live Sync", Cloud Foundry Live, Altoros, Available online at: https://www.altoros.com/blog/advanced-real-time-debugging-with-bluemix-live-sync/, Jun. 21, 2017, 13 pages.
Iturria; Carlos Rodriguez, "Teaching Best Practices to Design, Build, Secure and Monitor APIs", RedThunder.Blog, Available online at: https://redthunder.blog/2017/09/22/teaching-best-practices-to-design-build-secure-and-monitor-apis/#more-7733, Sep. 22, 2017, 22 pages.
Kang et al., "Container and Microservice Driven Design for Cloud Infrastructure DevOps", 2016 IEEE International Conference on Cloud Engineering, Apr. 4, 2016, pp. 202-211.
Kannan et al., "Resource Quality of Service in Kubernetes", Available online at: https://github.com/kubernetesjcommunityjblobjca6e45b508cd1031905ad433803de12bfe72b8b6jcontributorsjdesign-proposalsjnode/resource-qos.md, Sep. 21, 2017, 4 pages.
Liu et al., "CIDE: An Integrated Development Environment for Microservices", 2016 IEEE International Conference on Services Computing, Jun. 27, 2016, pp. 808-812.
Marko; Kurt, "How to Manage Microservices With a Container Registry", An Essential Guide to Software Container Usability and Management, Markolnsights, Available Online At: https://searchapparchitecture.techtarget.com/tip/How-to-manage-microservices-with-a-container-registry, Feb. 7, 2017, 5 pages.
Numan; Milco, "My First Experience with Oracle API Platform Cloud Service—Part 1", Available online at: https://www.syntouch.nl/my-first-experience-with-oracle-api-platform-cloud-service-part-1/, Jun. 6, 2017, 16 pages.
NUMA; Milco, "My First Experience with Oracle API Platform Cloud Service—Part 2", Available online at: https://www.syntouch.nl/my-first-experience-with-oracle-api-platform-cloud-service-part-2/, Jun. 23, 2017, 16 pages.
Pellegram; Gilbert, "Running Wordpress in a Kubernetes Cluster", Available Online at: https://deliciousbrains.com/running-wordpress-kubernetes-cluster/, Aug. 22, 2017, pp. 1-3.
TOZZI; Christopher, "Deploying Microservices on OpenShift using Kubernetes'", Red Hat Developer, Available Online At: https://developers.redhat.com/blog/2016/08/16/deploying-microservices-on-openshift-using-kubernetes/, Aug. 16, 2016, 9 pages.
U.S. Appl. No. 16/147,305, Notice of Allowance dated Nov. 14, 2019, 8 pages.
U.S. Appl. No. 16/147,332, Non-Final Office Action dated Mar. 26, 2020, 26 pages.
U.S. Appl. No. 16/147,334, First Action Interview Pilot Program Pre-Interview Communication dated Sep. 6, 2019, 5 pages.
U.S. Appl. No. 16/147,334, Notice of Allowance dated Nov. 12, 2019, 14 pages.
U.S. Appl. No. 16/147,343, Non-Final Office Action dated Mar. 27, 2020, 22 pages.
International Application No. PCT/US2018/053612, International Search Report and Written Opinion dated Jan. 28, 2019, 15 pages.
International Application No. PCT/US2018/053618, International Search Report and Written Opinion dated Jan. 16, 2019, 17 pages.
International Application No. PCT/US2018/053620, International Search Report and Written Opinion dated Jan. 23, 2019, 15 pages.
International Application No. PCT/US2018/053626, International Search Report and Written Opinion dated Jan. 31, 2019, 15 pages.
International Application No. PCT/US2018/053628, International Search Report and Written Opinion dated Jan. 10, 2019, 11 pages.
Richardson, *Building Microservices: Using an API Gateway*, Available Online at: https://www.nginx.com/blog/building-microservices-using-an-api-gateway/, Jun. 15, 2015, pp. 1-13.
Taber, *Deploying Java Microservices on Amazon Elastic Container Service*, Available Online at: https://aws.amazon.com/blogs/compute/deploying-java-microservices-on-amazon-ec2-container-service/, Jul. 11, 2017, pp. 1-13.
U.S. Appl. No. 16/147,332, Final Office Action dated Aug. 4, 2021, 35 pages.
U.S. Appl. No. 16/147,351, First Action Interview Pilot Program Pre-Interview Communication dated Apr. 15, 2020, 8 pages.
Chinese Application No. CN201880069219.3, Office Action dated Jan. 15, 2021, 20 pages. (10 pages of Original Document and 10 pages of English Translation).
Chinese Application No. CN201880069226.3, Office Action dated Jan. 14, 2021, 10 pages. (5 pages of Original Document and 5 pages of English Translation).
Indian Application No. 202047011852, First Examination Report dated Mar. 11, 2022, 8 pages.
Indian Application No. 202047012114, First Examination Report dated Mar. 15, 2022, 6 pages.
Indian Application No. 202047012700, First Examination Report dated Mar. 15, 2022, 6 pages.
Indian Application No. 202047012113, First Examination Report dated May 12, 2022, 8 pages.
U.S. Appl. No. 16/147,332, Final Office Action dated Aug. 25, 2022, 40 pages.

* cited by examiner

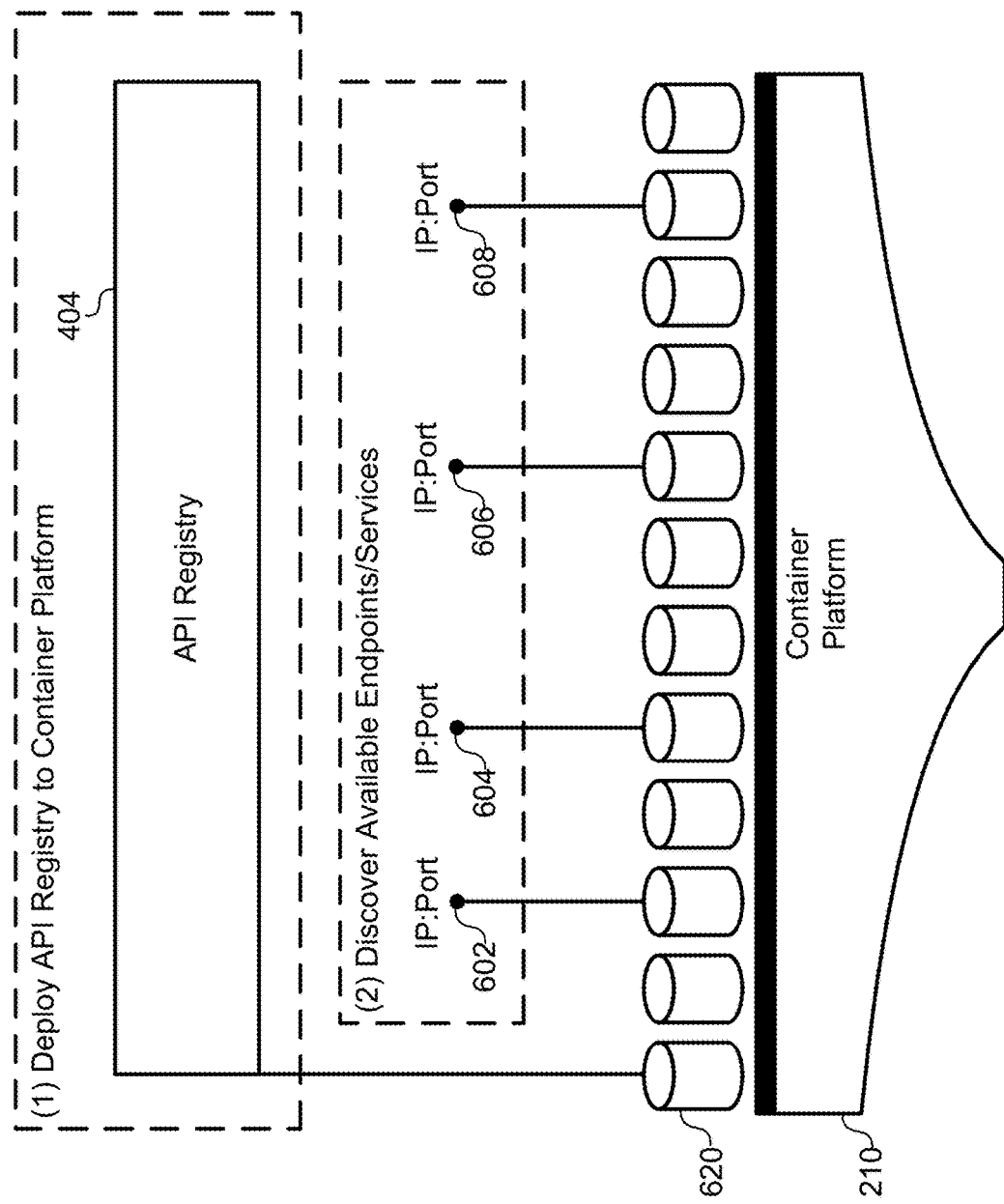

```
Class User {

Public User CreateUser(str first_name, str last_name, int id) {

UserName = first_name + last_name

UserID = id

Header = . . .

POST http://192.168.2.100:8000/v1/user/create/<data>

```
Class User {

Public User CreateUser(str first_name, str last_name, int id) {

UserName = first_name + last_name

UserRole = GetRole(UserName)   ⌐1304

UserID = id

Header = . . .

Result = POST http://192.168.2.100:8000/v1/user/create/<data>
                                                                    ⌐1308
    if (Result.status == OK) then   ⌐1306 return new User(Result.name, Result.role, . . . )

```
Class User {

Public User CreateUser(str first_name, str last_name, int id) {

UserName = first_name + last_name

UserID = id

Header = . . .

Result.status = NotOK while (Result != OK)

Result = POST http://192.168.2.100/8000/v1/user/create/<data>    ⎫ 1404

API REGISTRY IN A CONTAINER PLATFORM PROVIDING PROPERTY-BASED API FUNCTIONALITY

CROSS-REFERENCES TO RELATED APPLICATIONS

This application is a continuation of U.S. application Ser. No. 16/147,305 filed on Sep. 28, 2018, which is incorporated herein by reference. U.S. application Ser. No. 16/147,305 claims of U.S. Provisional Application No. 62/566,351 filed on Sep. 30, 2017, which is incorporated herein by reference. This application is also related to the following commonly assigned applications:

- U.S. patent application Ser. No. 16/147,334 filed on Sep. 18, 2018, titled API REGISTRY IN A CONTAINER PLATFORM FOR AUTOMATICALLY GENERATING CLIENT CODE LIBRARIES, which is incorporated herein by reference;
- U.S. patent application Ser. No. 16/147,343 filed on Sep. 28, 2018, titled DYNAMIC NODE REBALANCING BETWEEN CONTAINER PLATFORMS, which is incorporated herein by reference;
- U.S. patent application Ser. No. 16/147,332 filed on Sep. 28, 2018, titled OPTIMIZING REDEPLOYMENT OF FUNCTIONS AND SERVICES ACROSS MULTIPLE CONTAINER PLATFORMS AND INSTALLATIONS, which is incorporated herein by reference; and
- U.S. patent application Ser. No. 16/147,351 filed on Sep. 28, 2018, titled REAL-TIME DEBUGGING INSTANCES IN A DEPLOYED CONTAINER PLATFORM, which is incorporated herein by reference.

BACKGROUND

In the abstract, containers in any form represent a standardized method of packaging and interacting with information. Containers can be isolated from each other and used in parallel without any risk of cross-contamination. In the modern software world, the term "container" has gained a specific meaning. A software container, such as a Docker® container, is a software construct the logically encapsulates and defines a piece of software. The most common type of software to be encapsulated in the container is an application, service, or microservice. Modern containers also include all of the software support required for the application/service to operate, such as an operating system, libraries, storage volumes, configuration files, application binaries, and other parts of a technology stack that would be found in a typical computing environment. This container environment can then be used to create multiple containers that each run their own services in any environment. Containers can be deployed in a production data center, an on-premises data center, a cloud computing platform, and so forth without any changes. Spinning up a container on the cloud is the same as spinning up a container on a local workstation.

Modern service-oriented architectures and cloud computing platforms break up large tasks into many small, specific tasks. Containers can be instantiated to focus on individual specific tasks, and multiple containers can then work in concert to implement sophisticated applications. This may be referred to as a microservice architecture, and each container can use different versions of programming languages and libraries that can be upgraded independently. The isolated nature of the processing within containers allows them to be upgraded and replaced with little effort or risk compared to changes that will be made to a larger, more monolithic architectures. Container platforms are much more efficient than traditional virtual machines in running this microservice architecture, although virtual machines can be used to run a container platform.

BRIEF SUMMARY

In some embodiments, a method of customizing deployment and operation of services in container environments may include receiving, at an API registry, a property for a service that is or will be encapsulated in a container that is or will be deployed in a container environment. The method may also include determining, by the API registry, whether the property for the service affects the deployment of the service to the container environment, and in response to a determination that the property affects the deployment of the service, deploying the service based at least in part on the property. The method may additionally include determining, by the API registry, whether the property for the service affects the generation of a client library that calls the service in the container environment, and in response to a determination that the property affects the generation of the client library, generating the client library based at least in part on the property. The method may further include determining, by the API registry, whether the property for the service affects how calls to the service are handled in the container environment, and in response to a determination that the property affects how the calls to the service are handled, handling the calls to the service based at least in part on the property.

In some embodiments, a non-transitory, computer-readable medium may include instructions that, when executed by one or more processors, causes the one or more processors to perform operations including receiving, at an API registry, a property for a service that is or will be encapsulated in a container that is or will be deployed in a container environment. The operations may also include determining, by the API registry, whether the property for the service affects the deployment of the service to the container environment, and in response to a determination that the property affects the deployment of the service, deploying the service based at least in part on the property. The operations may additionally include determining, by the API registry, whether the property for the service affects the generation of a client library that calls the service in the container environment, and in response to a determination that the property affects the generation of the client library, generating the client library based at least in part on the property. The operations may further include determining, by the API registry, whether the property for the service affects how calls to the service are handled in the container environment, and in response to a determination that the property affects how the calls to the service are handled, handling the calls to the service based at least in part on the property.

In some embodiments, a system may include one or more processors and one or more memory devices comprising instructions that, when executed by the one or more processors, cause the one or more processors to perform operations including receiving, at an API registry, a property for a service that is or will be encapsulated in a container that is or will be deployed in a container environment. The operations may also include determining, by the API registry, whether the property for the service affects the deployment of the service to the container environment, and in response to a determination that the property affects the deployment of the service, deploying the service based at least in part on the property. The operations may additionally include determining, by the API registry, whether the property for the service affects the generation of a client library that calls the service in the container environment, and in response to a determination that the property affects the generation of the client library, generating the client library based at least in part on the property. The operations may further include determining, by the API registry, whether the property for the service affects how calls to the service are handled in the container environment, and in response to a determination that the property affects how the calls to the service are handled, handling the calls to the service based at least in part on the property.

In any embodiments, any or all of the following features may be included in any combination and without limitation. The property may include code that is executed by the API registry. The property may include flags that are used by the API registry to select predefined processes to execute. Determining, by the API registry, whether the property for the service affects the deployment of the service to the container environment may include determining that the property indicates that the service should be deployed to the container environment such that it has high availability. Deploying the service based at least in part on the property may include deploying multiple containerized instances of the service to the container environment. Determining whether the property for the service affects the generation of the client library that calls the service in the container environment may include determining that the property indicates that the service requires end-to-end encryption. Generating the client library based at least in part on the property may include generating code in the client library that encrypts data before it is sent in a service call to an endpoint of the service. Determining whether the property for the service affects the generation of the client library that calls the service in the container environment may include determining that the property indicates that calling services should log usage of the service. Generating the client library based at least in part on the property may include generating code in the client library that logs usage information for calls to an endpoint of the service. Determining whether the property for the service affects how the calls to the service are handled in the container environment may include determining that the property indicates that the service should be instantiated on-demand in the container environment.

Handling the calls to the service based at least in part on the property may include generating, by the API registry, a containerized instance of the service in response to receiving an indication that a calling service will send a request to the service. The client library may include an object class with member functions that implement the API functions to make direct calls to an endpoint of the service. The method/operations may also include receiving, at the API registry, an API definition that may include an endpoint of the service in the container environment and one or more API functions. The property for the service may be received with the API definition. The container environment may include a plurality of services encapsulated in containers. The API registry may be deployed as a service encapsulated in a container in the container environment. The API registry may be available to services in development in an Integrated Development Environment (IDE) and services already deployed in the container environment. Determining whether the property for the service affects how the calls to the service are handled in the container environment may include determining that the property indicates that the service should be rate-limited when calls are made to the service in the container environment.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIG. 6B illustrates a software structure of a container platform when the API registry is deployed using the flowchart in FIG. 6A, according to some embodiments.

FIG. 11 illustrates an example of a client library generated automatically for a service by the API registry, according to some embodiments.

FIG. 13 illustrates an embodiment of a client library that can marshal additional data to complete an input data set for a service call, according to some embodiments.

FIG. 14 illustrates a client library that can handle retries when calling a service, according to some embodiments.

DETAILED DESCRIPTION

Figure 1:
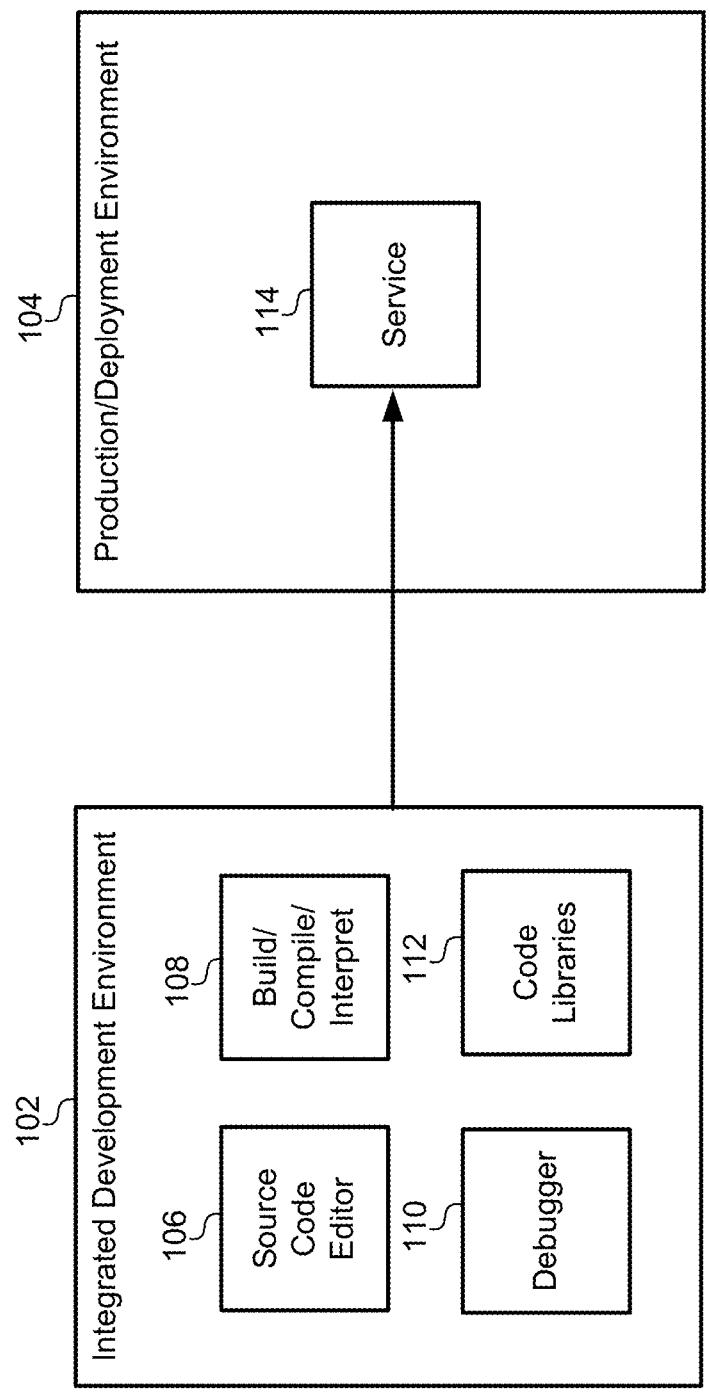
FIG. 1 illustrates a software structure and logical arrangement of development and runtime environments for services in a container platform, according to some embodiments.

Described herein, are embodiments for an Application Programming Interface (API) registry that is part of an Integrated Development Environment (IDE) that allows developers to register services during development and make those services available to other services both during and after deployment. The API registry can be deployed as part of an orchestrated container platform, operating as a containerized application on the container platform. As services or microservices are developed and deployed into containers on the container platform, the API registry can execute a discovery process to locate available endpoints (e.g., IP addresses and port numbers) within the container platform that correspond to available services. The API registry can also accept an upload of an API definition file that can be used to turn the raw service endpoint into an API function made available through the API registry. The API registry can dynamically bind the discovered endpoint to an API function that be kept up-to-date and made available to other services in the container platform. This provides a stable endpoint that other services can statically call while the API registry manages any changes to the binding between the API function in the service endpoint. This also simplifies the process for using services in the container platform. Instead of writing code for an HTTP call, new services can simply use the API interface to access registered services.

In some embodiments, the IDE can provide a navigation/browse interface for developers to locate services that are available in the container platform and registered with the API registry. When calls to existing services are created by the API registry for new services under development, the API registry can automatically generate a set of client libraries that include all the necessary functionality to interact with the registered service. For example, some embodiments may generate an object class that includes member functions corresponding to API calls. During development, new services can simply instantiate these objects and/or use their member functions to make a call to the corresponding API. The code in the client libraries governs a direct connection between the calling service and the endpoint of the registered service and may include code that handles all the functionality necessary for this interaction. For example, the automatically generated client libraries may include: code for packaging and formatting parameters from the API call into an HTTP call to the service endpoint, code for marshaling data to complete parameter sets for the call, code for packaging information into a compatible packet (JSON, XML, etc.), code for receiving and parsing result packets, code for handling retries and error conditions, and so forth. From the calling service's perspective, the code to handle all of this functionality is automatically generated by the API registry and therefore abstracts and encapsulates the details of the service call into the client library object. All that is required of the calling service is to execute a member function of the client library object created by the API registry.

In some embodiments, the API registry can also accept an upload of a set of properties that may define the runtime execution of the registered service. This set of properties can be uploaded during development along with the API definition file. These properties can define runtime characteristics, such as end-to-end encryption, usage/logging requirements, user authentication, on-demand service instantiation, multiple service deployment instances for high availability, rate/usage limiting, and other runtime characteristics. The API registry can ensure that these properties are met by interacting with the container environment during development, during deployment, and during runtime. During development, the automatically generated client libraries for calling services can include code that may be required to execute these properties, such as encryption code, usage logging code, and/or interaction with a user authentication service. When a registered service is being deployed, the API registry can instruct the container platform to instantiate multiple instances of the service and/or additional load-balancing modules to ensure high reliability of the service during runtime. During runtime when a service is called, the API registry can cause the service to be instantiated for on-demand instantiation, limit the number of API calls that can be made to throttle usage, and perform other runtime functions.

FIG. 1 illustrates a software structure and logical arrangement of development and runtime environments for services in a container platform, according to some embodiments. The environments may include an IDE 102 that may be used to develop services and microservices to be deployed on a container platform. An IDE is a software suite that consolidates and provides all of the basic tools that service developers can use to write and test new services. The IDE 102 may include a source code editor 106 with a graphical user interface (GUI), code completion functions, and navigate/browse interfaces that allow a developer to write, navigate, integrate, and visualize the source-code-writing process. The IDE 102 may also include a debugger 110 that includes variable interfaces, immediate variable interfaces, expression evaluation interfaces, memory content interfaces, breakpoint visualization and functionality, and other debugging functions. The IDE 102 may also include a compiler and/or interpreter 108 for compiling and running compiled machine code or interpreted byte code. The compiler/interpreter 108 can include build tools that allow developers to use/generate makefiles another build automation constructs.

Some embodiments of the IDE 102 may include code libraries 112 that include common code functions, objects, interfaces, and/or other structures that can be linked into a service under development and reused across multiple developments.

Services can be developed and thoroughly tested within the IDE 102 until they are ready for deployment. The services can then be deployed to a production/deployment environment 104. The production/development environment 104 may include many different hardware and/or software structures, including dedicated hardware, virtual machines, and containerized platforms. Prior to this disclosure, when a service 114 was deployed into the production/deployment environment 104, the service 114 would no longer have runtime access to many of the tools used in the IDE 102. Any functionality needed by the service 114 to run in the production/development environment 104 needed to be packaged from the code libraries 112 and deployed with the service 114 into the production/deployment environment 104. Additionally, the service 114 would typically be deployed without any of the functionality for the debugger 110 or a copy of the source code from the source code editor 106. Essentially, the service 114 would be deployed to the production/deployment environment 104 with all of the functionality required for runtime operation, but would be stripped of the information that was only used during development.

Figure 2:
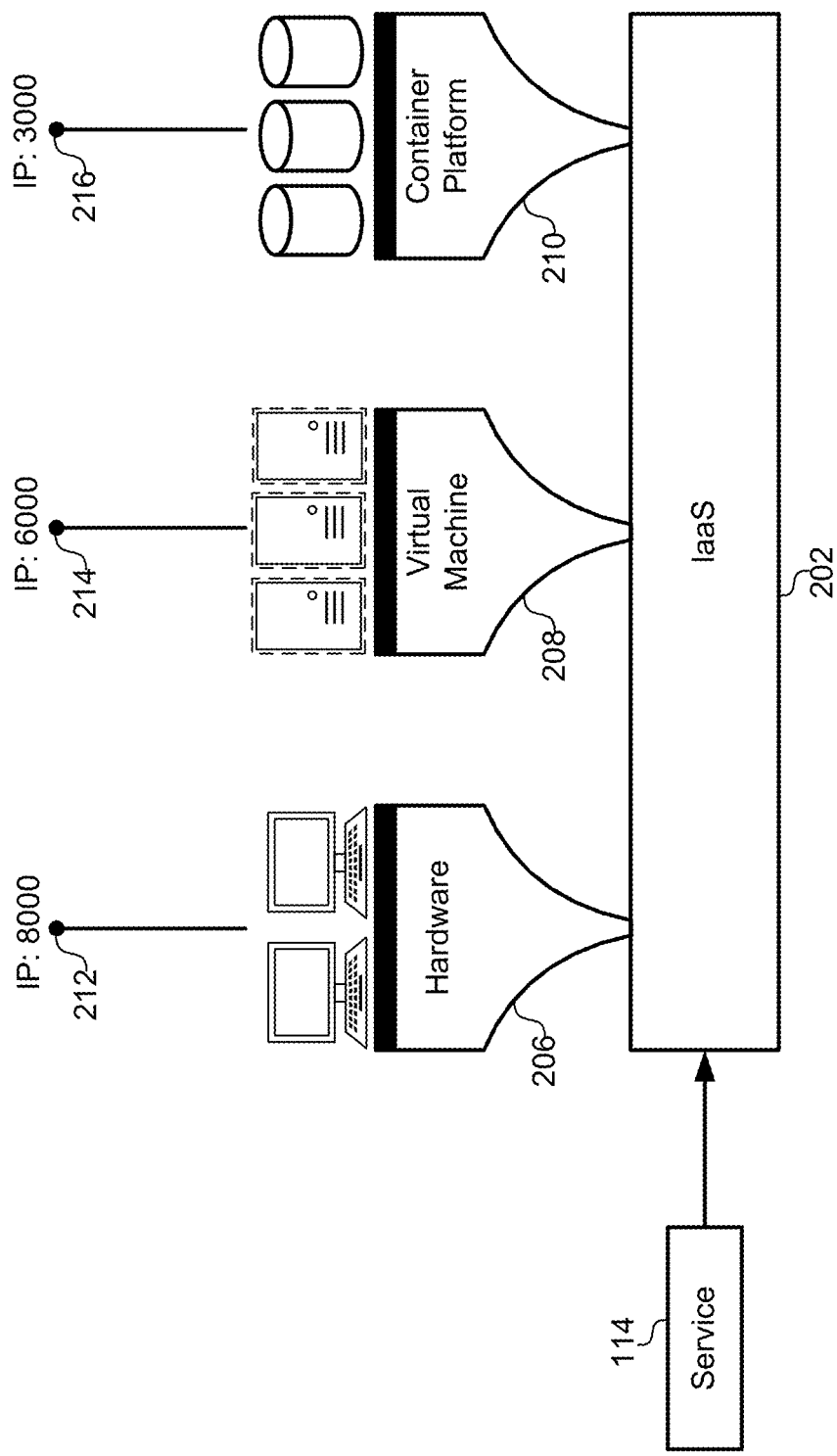
FIG. 2 illustrates a specialized computer hardware system that is specifically designed to run the embodiments described herein.

FIG. 2 illustrates a specialized computer hardware system that is specifically designed to run the embodiments described herein. By way of example, the service 114 can be deployed into an Infrastructure as a Service (IaaS) cloud computing environment 202. This is a form of cloud computing that provides virtualized or shared computing resources over a network. The IaaS cloud computing environment 202 may also include or be coupled with other cloud computing environments arranged as Software as a Service (SaaS) and/or Platform as a Service (PaaS) architectures. In this environment, the cloud provider can host an infrastructure of hardware and/or software components that were traditionally present in an on-premises data center. This hardware may include servers, storage, networking hardware, disk arrays, software libraries, and virtualization utilities such as a hypervisor layer. The IaaS environment 202 can be provided by a commercial source, such as Oracle® or other publicly available cloud platforms. The IaaS environment 202 may also be deployed as a private cloud using a private infrastructure of hardware and software.

Regardless of the type of cloud environment, the service 114 can be deployed onto a number of different types of hardware/software systems. For example, the service 114 can be deployed to dedicated hardware 206. The dedicated hardware 206 may include hardware resources, such as servers, disks, operating systems, software packages, and so forth, that are specifically assigned to the service 114. For example, a specific server may be allocated to handle traffic flowing to and from the service 114.

In another example, the service 114 can be deployed to hardware/software that is operated as one or more virtual machines 208. A virtual machine is an emulation of a computer system that provides the functionality of the dedicated computer hardware 206. However, instead of being dedicated to a specific function, the physical hardware can be shared by number of different virtual machines. Each virtual machine can provide all the functionality needed to execute including a complete operating system. This allows virtual machines having different operating systems to run on the same physical hardware and allows multiple services to share a single piece of hardware.

In a another example, the service 114 can be deployed to a container platform 210. The container platform differs from the virtual machines 208 in a number of important ways. First, the container platform 210 packages individual services into containers as described in greater detail below in FIG. 3. Each container shares a host operating system kernel, and they also share binaries, libraries, and other read-only components. This allows containers to be exceptionally light—often only a few megabytes in size. Additionally, a lightweight container is very efficient, taking just seconds to start versus the minutes required to boot up a virtual machine. Containers also reduce management overhead by sharing the operating system and other libraries that can be maintained together for the entire set of containers in the container platform 210. Even though containers share the same operating system, they provide an isolated platform, as the operating system provides virtual-memory support for isolation. Container technologies may include Docker® containers, the Linux Libcontainer®, the Open Container Initiative (OCI), Kubernetes®, CoeOS, Apache® Mesos, along with others. These containers can be deployed to a container orchestration platform, which may be referred to herein as simply the "container platform" 210. A container platform manages the automated arrangement, coordination, and management of deployed software containers. The container platform 210 can provide service discovery, load-balancing, health checks, multiple deployments, and so forth. The container platform 210 may be implemented by any publicly available container platform, such as Kubernetes, that runs containers organized in nodes and pods.

Regardless of the platform 206, 208, 210 on which the service 114 is deployed, each of the platforms 206, 208, 210 can provide service endpoints 212, 214, 216 that provide public access for calling the service 114. Generally, these endpoints can be accessed through an HTTP call and are associated with an IP address and a port number. By connecting to the correct IP address and port number, other services can call services deployed to any of the platforms 206, 208, 210 when they are made publicly available. Each service, such as service 114, may include its own proprietary formats and data requirements for calling the service. Similarly, each service may return results that are specific in format and data type to that service 114. In addition to the service-specific requirements, the particular deployment platform 206, 208, 210 may also include additional requirements for interacting with the service 114, such as programming languages, package formats (JSON, XML, etc.) that need to be complied with to properly interact with the service, and so forth.

Although the examples above allow the service 114 to be deployed to any of the described platforms 206, 208, 210, the embodiments described herein are specifically designed for the container platform 210 described above. Thus, embodiments that are specifically recited to be deployed in a "container platform" can be distinguished from other embodiments that are specifically recited to be deployed in a virtual machine platform, on the server or dedicated hardware platform, or generally in an IaaS environment.

Figure 3:
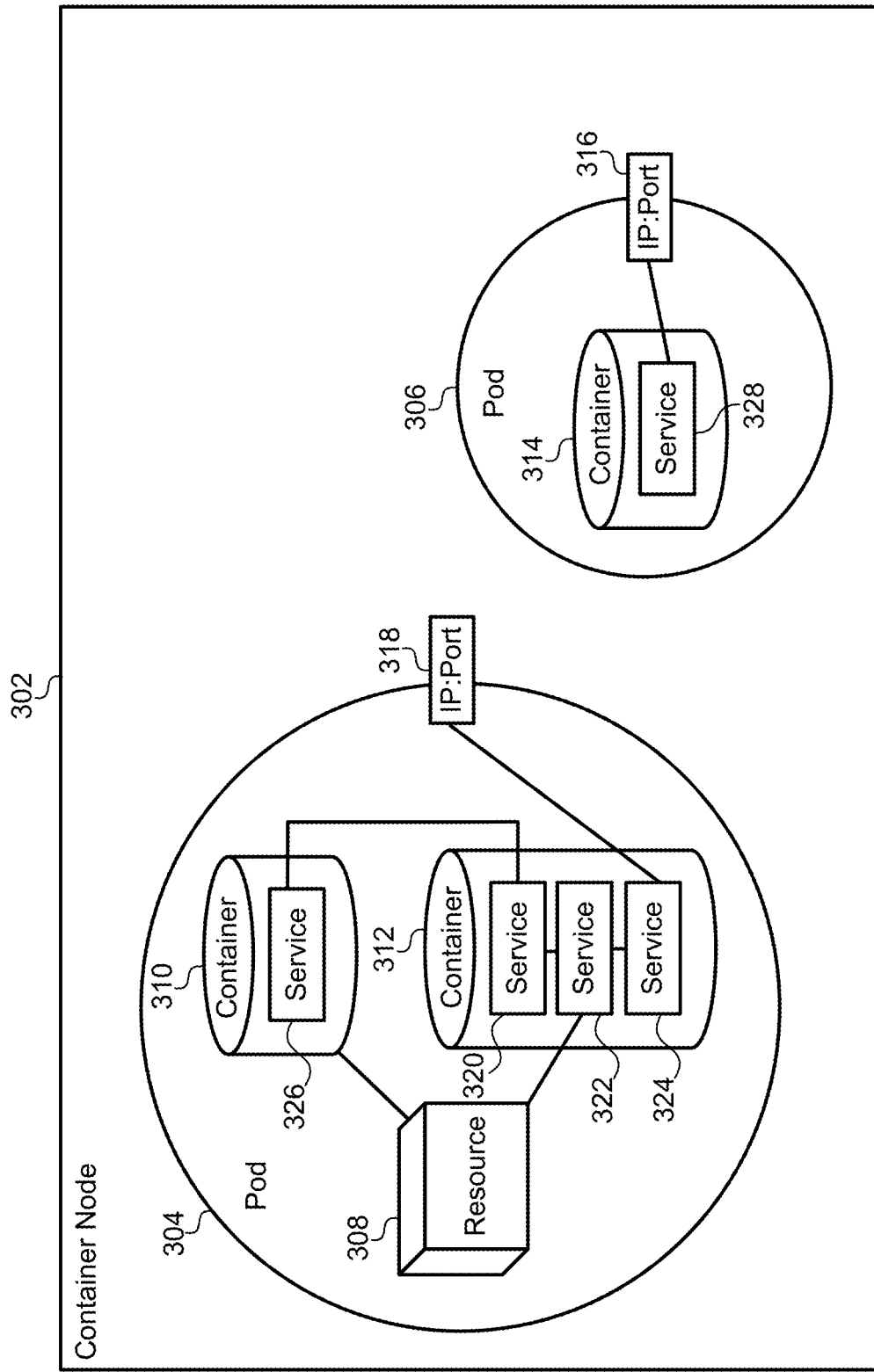
FIG. 3 illustrates a data organization that may be specific to the container platform used by some of the embodiments described herein.

FIG. 3 illustrates a data organization that may be specific to the container platform 210 used by some of the embodiments described herein. Generally, any deployment of a service to the container platform will be deployed to a pod 304, 306. A pod is an abstraction that represents a group of one or more application containers (e.g., Docker or rkt). A pod may also include some shared resources that are commonly available to all of the containers within the pod. For example, pod 304 includes container 310 and container 312. Pod 304 also includes a shared resource 308. The resource may include a storage volume or other information about how containers are run or connected within the pod 304. The pod 304 can model an application-specific logical host that contains different service containers 310, 312 that are relatively tightly coupled. For example, service 326 in container 310 can utilize the resource 308 and call service 320 in container 312. Service 320 can also call service 322, which in turn calls service 324, each of which are deployed to container 312. The output of service 324 can be provided to a network IP address and port 318, which is another common resource shared by the pod 304. Thus, the services 320, 322, 324, 326 all work together with the shared resource 308 to provide a single service that can be accessed by the IP address and port number 318 by services run in other containers. The service can also be accessed through the IP address and port 318 by computer systems that are external to the container platform, such as a workstation, a laptop computer, a smart phone, or other computing device that is not part of the container platform or IaaS environment.

In the simplest deployment, each container may include a single service, and each pod may include a single container that encapsulates the service. For example, pod 306 includes only a single container 314 with a single service 328. The single service is accessible through the IP address and port number 316 of the pod 306. Typically, when a service is deployed to the container platform, a container and a pod will be instantiated to hold the service. A number of different pods can be deployed to a container node 302. Generally, pods run within nodes. A node represents a worker machine (either virtual or physical) in the container platform. Each node is managed by a "master" that automatically handles scheduling pods within each of the nodes. Each node can run a process that is responsible for communication between the master and the node and for managing the pods in containers on the machine represented by the node. Each node may also include a container runtime responsible for pulling a container image from a registry, unpacking the container, and running the service.

Figure 4:
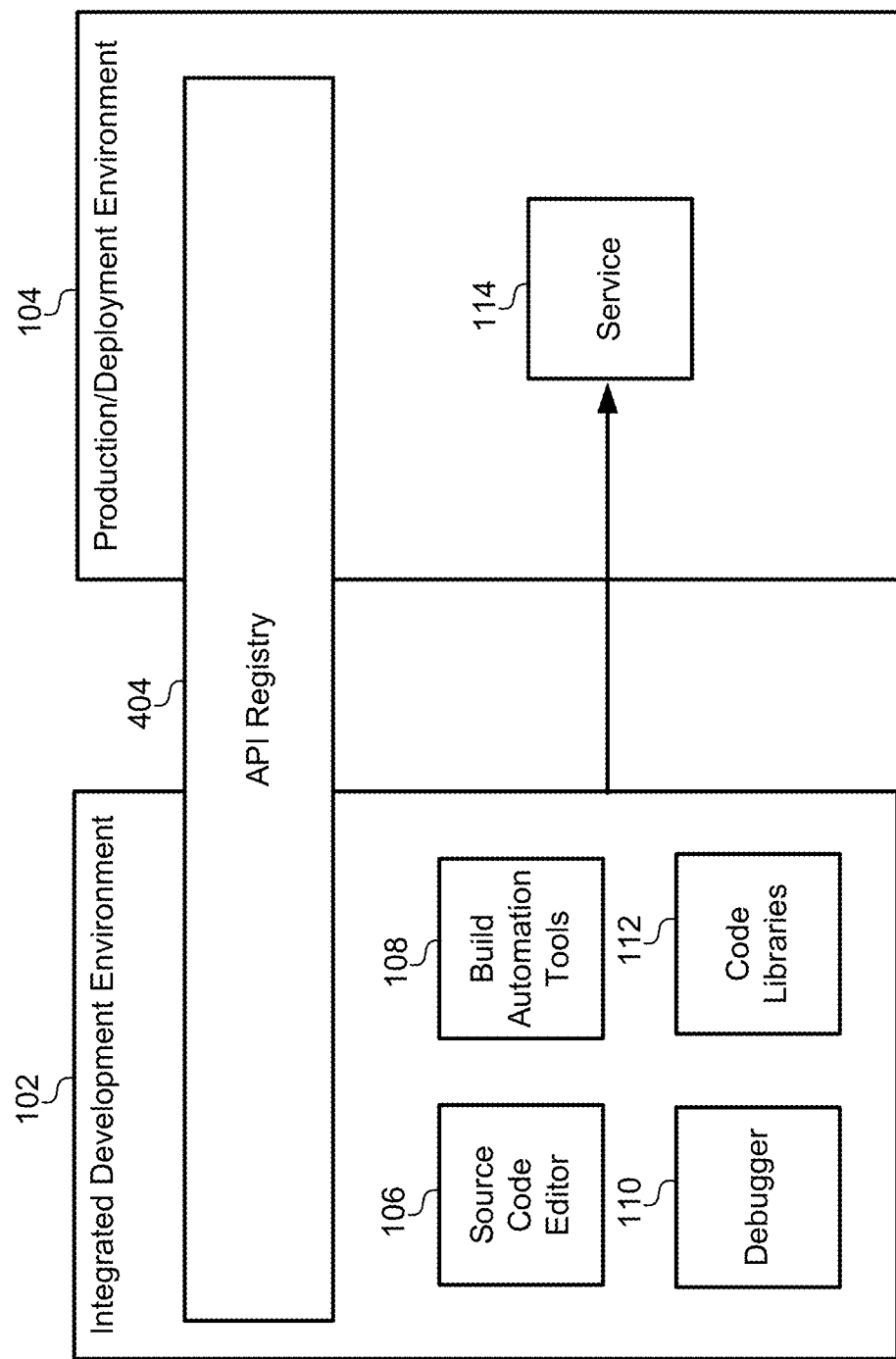
FIG. 4 illustrates an API registry that can be deployed to the IDE and the production/runtime environment, according to some embodiments.

FIG. 4 illustrates an API registry 404 that can be deployed to the IDE 102 and the production/runtime environment 104, according to some embodiments. As described above, a technical problem exists wherein when the service 114 is deployed from the IDE 102 to the production/deployment environment 104, the service 114 loses runtime access to information that is exclusively available in the IDE 102. The API registry 404 is accessible by the service 114 while it is deployed and operating during runtime in the production/ development environment 104. The previous technical problem that isolated development functions from runtime functions is overcome by the API registry 404 by the registration of services with the API registry 404 during development and providing an API definition and/or API properties to the API registry 404. The information defining the API can be used by new services in development in the IDE 102 as well as services that have been deployed to the production/ deployment environment 104. After this registration process is complete, the service 114 can operate using client libraries that access the API registry 404 during runtime to ensure that the API functions are correctly bound to the current IP address and port number of the corresponding service. The API registry 404 represents a new data structure and processing unit that was specifically designed to solve these technical problems.

Another technical problem that existed in the art was implementing service properties as they are deployed to the production/development environment 104. For example, if a service was to be deployed with high availability, the developer would need to build container deployment files that specifically instantiated multiple instances of the service in the container platform and balanced traffic in such a way that the service was always available. Service developers did not always have this expertise, nor were they often able to manage the deployment of their service. As described below, the API registry 404 allows a service to simply select properties, such as high availability, that can then be implemented automatically by the API registry 404. This technical solution is possible because the API registry 404 bridges the gap between the IDE 102 and the production/deployment environment 104.

Figure 5:
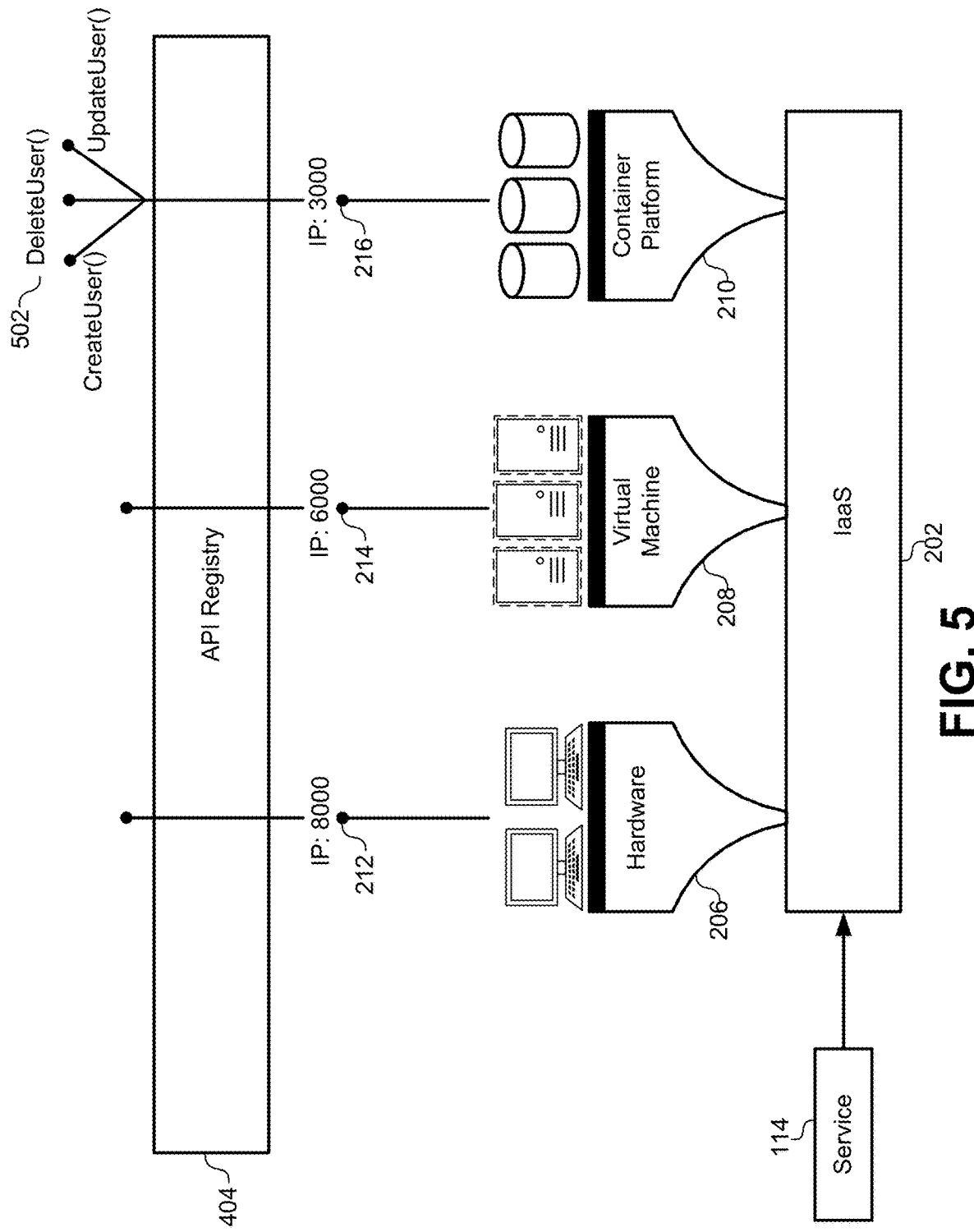
FIG. 5 illustrates the deployment of the API registry for use with the container platform at runtime, according to some embodiments.

FIG. 5 illustrates the deployment of the API registry 404 for use with the container platform 210 at runtime, according to some embodiments. One of the technical solutions and improvements to the existing technology offered by the API registry 404 is the maintenance of stable endpoints for service calls, as well as the simplification and automatic code generation for accessing the service calls. Prior to this disclosure, calls between services were point-to-point connections using, for example, an HTTP call to an IP address and port number. As services are updated, replaced, relocated, and redeployed in the container platform 210, the IP address and port number may change frequently. This required all services that called an updated service to update their IP address and port numbers in the actual code that called that service. The API registry 404 solves this technical problem by providing a dynamic binding between the IP address and port number of a service and an API function that is made available through the API registry. The client libraries that are automatically generated by the API registry 404 can include a function that accesses the API registry 404 to retrieve and/or verify a current IP address and port number for a particular service. Thus, a first service connecting to a second service need only perform a one-time generation of a client library to provide a lifetime-stable connection to the second service.

Another technical problem solved by the API registry 404 is the automatic generation of client libraries. Prior to this disclosure, a first service accessing a second service required the developer to write custom code for accessing the second service. Because this code could change over time, incompatibilities would a rise between the first and second services that required updates to both services. The API registry 404 solves this technical problem by uploading an API definition file that is used to automatically generate client libraries for calling services. Therefore, a service can specify specifically how the calling code in any other service should operate, which guarantees compatibility. These client libraries also greatly simplify and encapsulate the code for calling the service. As described below, a complicated HTTP call using IP address and a port numbers can be replaced with a simple member function call in a language that is specific to the calling service (e.g., Java, C#, etc.). This allows a calling service to select an API function from the API registry 404, and the code that implements at function can be downloaded to the calling service as a client library.

Figure 6A:
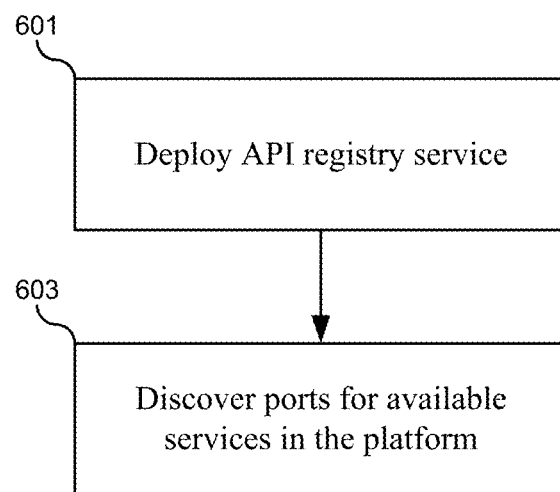
FIG. 6A illustrates a flowchart of a method for deploying the API registry, according to some embodiments.

FIG. 6A illustrates a flowchart of a method for deploying the API registry 404, according to some embodiments. The method may include deploying the API registry service to the container environment (601). The API registry can be implemented as a service operating in the container environment within the container. Thus, the API registry can be actively running after services are deployed within the container environment such that it can be accessed at run time. The API registry can also be linked to the existing IDE described above. The method may further include discovering ports for available services in the container platform (603). As services are deployed to the container platform, the API registry can launch a discovery process that sequentially traverses each of the services deployed to the container platform. For each service, the API registry can detect and record an IP address and a port number. The listing of IP address and port numbers discovered by this process can be stored in a data structure, such as a table associated with the API registry. Each IP address and port number can also be stored with a name for the service or other identifier that uniquely identifies the service on the container platform. These initial steps shown in flowchart in FIG. 6A provide a starting point for the API registry to begin operating in the runtime environment of the container platform and to be available to services under development in the IDE.

FIG. 6B illustrates a software structure of the container platform 210 when the API registry is deployed using the flowchart in FIG. 6A, according to some embodiments. As described above, the API registry 404 can be deployed to a container 620 in the container platform 210. The container 620 can operate within one or more pods and within a node as described above in FIG. 3. The API registry 404 can be made privately available to any of the other containers in the container platform 210. In some embodiments, the API registry 404 can also be made publicly available to other devices that are not part of the container platform 210. As a containerized service, the API registry 404 may have an IP address and port number that are available to other services. However, the IP address and port number of the API registry 404 would only be used by the code that is automatically generated in client libraries, therefore some embodiments do not need to publish the IP address and port number for the API registry 404. Instead, the client libraries in the IDE itself can maintain an up-to-date listing of the IP address and port number for the API registry 404 such that it can be contacted during development, deployment, and runtime of other services.

After deploying the API registry 404 to the container 620, the API registry 404 can execute a discovery process. The discovery process can use a directory listing for nodes in the container platform to identify pods that implement services with an IP address and port number. The API registry 404 can then access a unique identifier, such as a number or name for each available service, and store an identifier with each IP address and port number in the container platform 210. This discovery process can be periodically executed to detect new services that are added to the container platform 210, as well as to identify existing services that are removed from the container platform 210. As described below, this discovery process can also be used to detect when an IP address and port number change for an existing service. For example, the API registry 404 can discover services having endpoints 602, 604, 606, 608. In the process described below, the API registry 404 can bind each of these endpoints 602, 604, 606, 608 to an API function that is registered with the API registry 404. At some point after this initial discovery, the IP address and/or port number for endpoint 602 may be changed when the service associated with endpoint 602 is replaced, updated, or revised. The API registry 404 can detect this change to endpoint 602 and update a binding to an existing API function provided by the API registry 44.

Similarly, the API registry 404 can use the discovery process to detect when endpoints are no longer available, and then remove the API functions associated with the service. In some embodiments, when a service has been registered with the API registry 404, but the corresponding API functions are not currently bound to a valid endpoint, the API registry 404 can provide a mock response to any service calling the corresponding API functions. For example, if an API has been registered for the service corresponding to endpoint 604, but endpoint 604 is not currently available, the API registry 404 can intercept a call made to endpoint 604 and provide default or dummy data in response. This allows services that call the service associated with endpoint 604 to maintain functionality and/or continue the design process without "breaking" the connection to this particular service. Mock/testing data scenarios will be described in greater detail below.

Figure 7A:
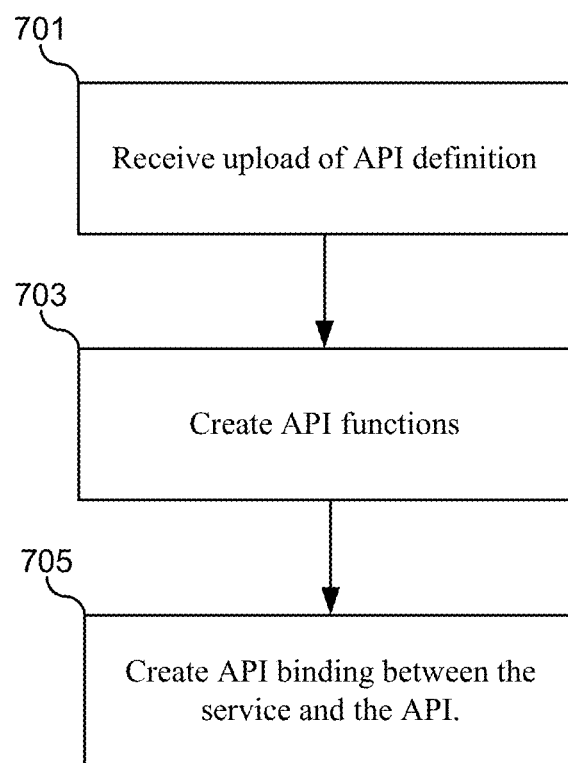
FIG. 7A illustrates a flowchart of a method for registering a service with the API registry, according to some embodiments.

FIG. 7A illustrates a flowchart of a method for registering a service with the API registry 404, according to some embodiments. The method may include receiving an upload of an API definition (701). The API definition may be provided in the form of a data packet, file, or a link to an information repository. The API definition may include any information that can be used to identify and define API functions that should be bound to endpoints associated with the service. For example, some embodiments of the API definition may include the following data: a service name or other unique identifier; function names corresponding to service endpoints and calls, data inputs required to call the service with corresponding descriptions and data types; result data formats and data types; a current IP address and/or port number; documentation that describes the functionality of the API functions that will be associated with the endpoint; default or dummy data values that should be returned during mock/test scenarios; and any other information that may be used by the API registry 404 to translate the HTTP request received by the endpoint into a client library that uses API function calls of class data objects.

The method may also include creating corresponding API functions based on the uploaded API definitions (703). These API functions can be generated automatically based on the API definition. Each endpoint for a service may be associated with a plurality of different API functions. For example, an endpoint implementing a RESTful interface may receive HTTP calls for POST, GET, PUT, and DELETE functions at the same IP address and port number. This may result in, for example, for different API functions. For example, if the interface represents a list of users, this can correspond to at least four different API functions, such as GetUser( ) AddUser( ) RemoveUser( ) and UpdateUser( ) Additionally, each API function may include a number of different parameter lists, such as UpdateUser(id), UpdateUser(name), UpdateUser(firstname, lastname), and so forth. These API functions can be generated and made available to other services through the API registry. As will be described in greater detail below, it should be noted that services are not required to call these functions through the API registry. Instead, these functions are made available to browse in the API registry, and when selected, the API registry can generate client libraries that implement these functions in the calling service.

The method may additionally include creating a binding in the API registry between the API function and the corresponding endpoint of the service (705). Based on the discovery process described above and the registration process of steps 701, the API registry can now create a dynamic binding between an endpoint for a service in the container platform and the API function created by the API registry. In the data structure formed above when discovering available endpoints and services, the API registry can now store a corresponding function or set of functions for each endpoint. As described above, this binding can be constantly updated as the discovery process determines when services are updated, moved, replaced, or added to the container platform. This allows the client libraries created in a calling service to first check with the API registry to verify or receive a current IP address and port number for the service.

Figure 7B:
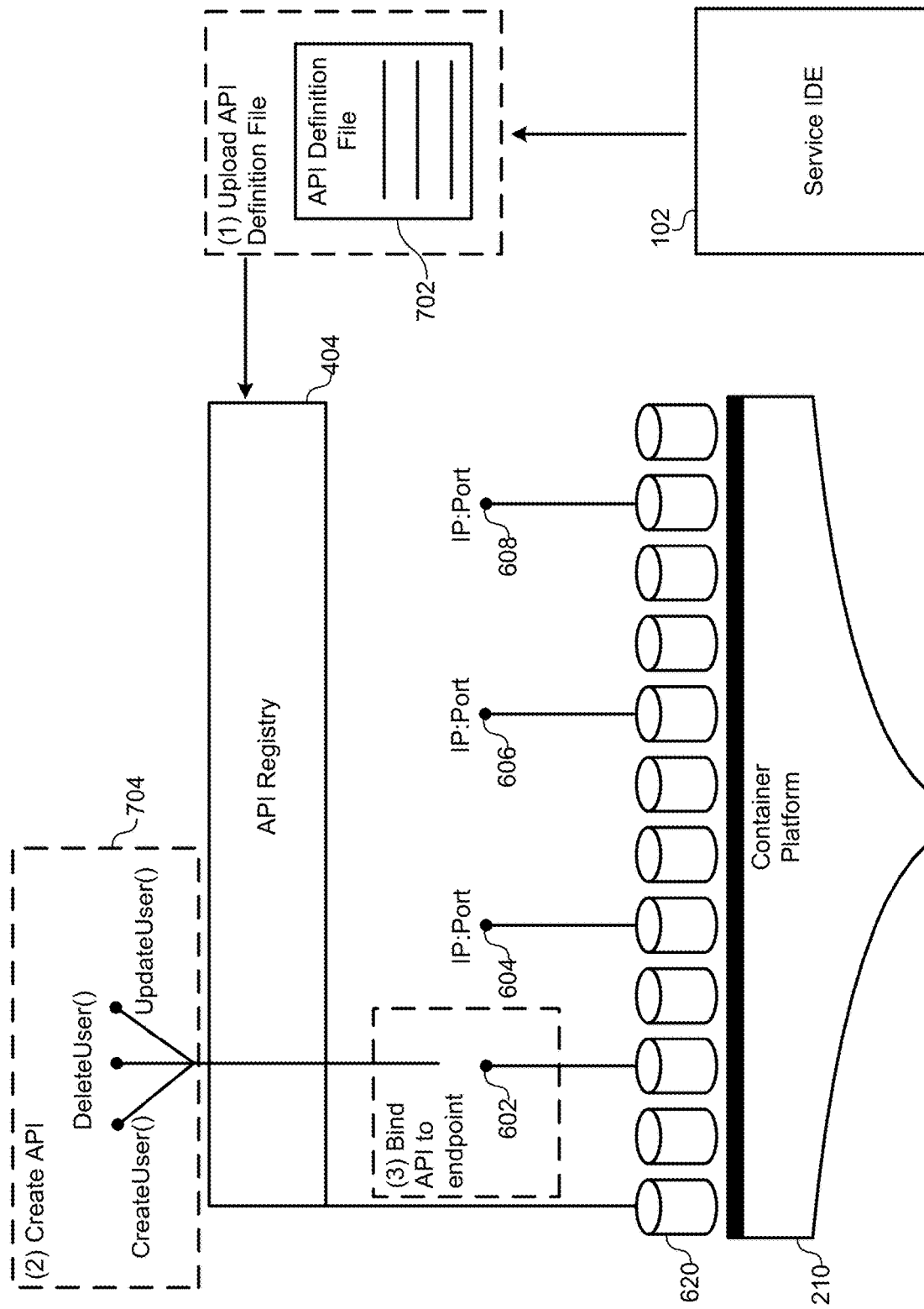
FIG. 7B illustrates a hardware/software diagram of the steps for registering an API with the API registry, according to some embodiments.

FIG. 7B illustrates a hardware/software diagram of the steps for registering an API with the API registry 404, according to some embodiments. As described above, the API registry 404 can be instantiated and running in a container 620 in the container platform 210. Even though the container platform 210 represents a production/deployment environment, the API registry 404 can still be accessed by the IDE 102 used to develop the service. Thus, the IDE 102 can provide a mechanism for uploading the API definition files 702 to the API registry 404. Specifically, the user interface of the IDE 102 may include a window or interface that allows the developer to define and/or populate fields for the API definition files 702. This information described above may include function names, parameter lists, data types, field lengths, object class definitions, an IP address and port number, a service name or other unique identifier, and so forth. This information can be uploaded to the API registry 404 and linked in a dynamic binding to a particular IP address and port number for the endpoint 602. Finally, the API registry 404 can generate one or more API functions 704 that can be made available through the API registry 404.

Figure 8:
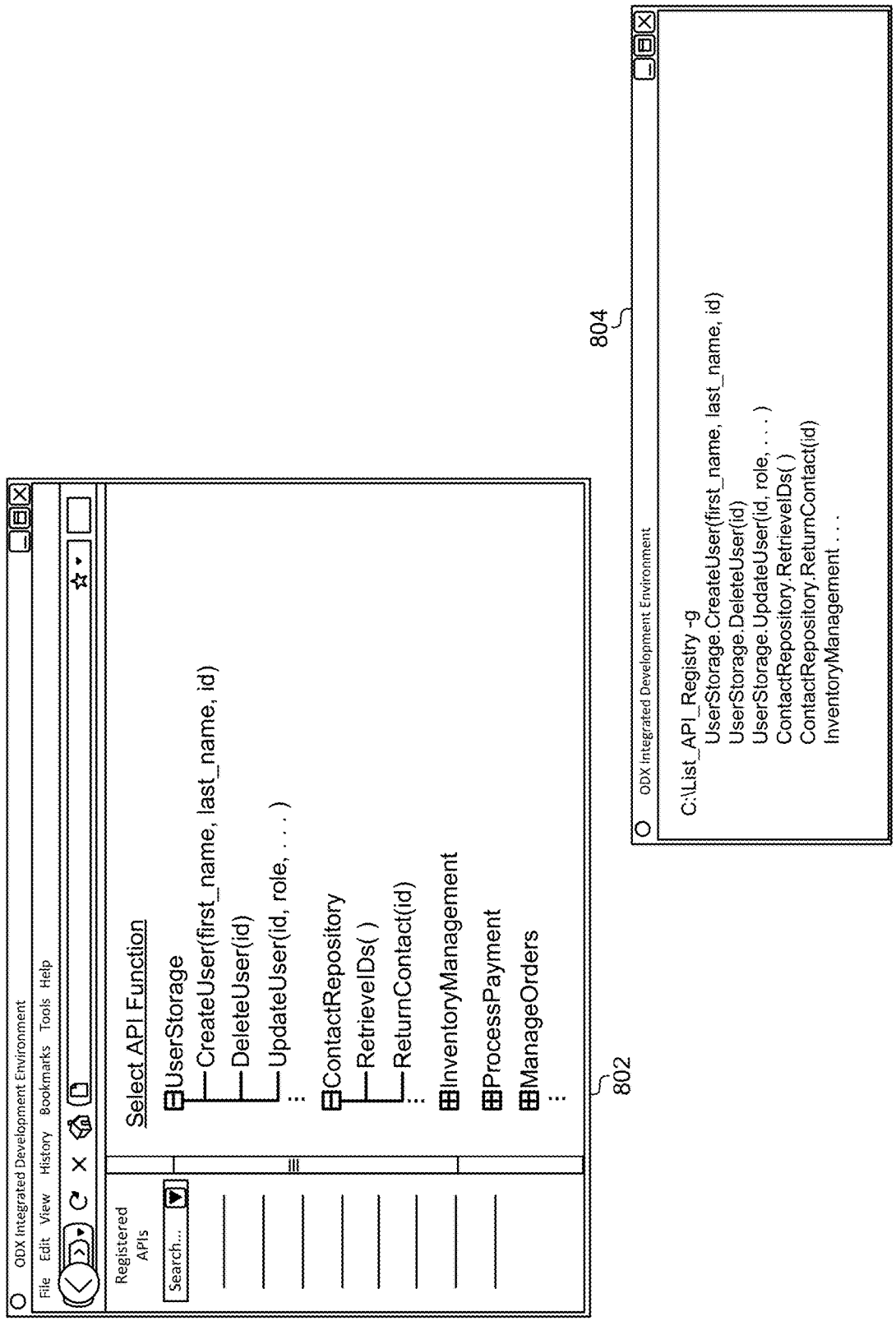
FIG. 8 illustrates examples of a graphical interface and a command line interface for browsing and selecting APIs that are registered with the API registry, according to some embodiments.

After registering a service with the API registry 404 and generating one or more API functions, the API registry can then make those functions available for developers as they design services. FIG. 8 illustrates examples of a graphical interface 802 and a command line interface 804 for browsing and selecting APIs that are registered with the API registry 804, according to some embodiments. When programming and developing a new service for the container platform, the developer can access the graphical interface 802 to browse and select API functions that can be used in their service. This graphical interface 802 is merely an example and not meant to be limiting of the types of graphical interfaces that can be used to browse and select API functions.

In this embodiment, the IDE 102 can summon the graphical interface 802 to provide a list of APIs that are registered with the API registry. In this embodiment, the APIs are categorized based on endpoint. For example, one endpoint corresponding to a service may offer a RESTful interface for storing user records (e.g., "UserStorage"). The graphical interface 802 can display all of the API functions (e.g., "CreateUser", "DeleteUser", "UpdateUser", etc.) that are available through the selected endpoint. Other embodiments may group functions based on the overall service in cases where the service offers multiple endpoints. The graphical interface 802 can receive a selection of one or more API functions to be used in a calling the service. The API registry can then provide documentation that illustrates how to use the API function, including required parameters and return values. One having ordinary skill in the art will understand that the command line interface 804 can provide similar information and can receive similar inputs as the graphical interface 802.

The interfaces 802, 804 illustrated in FIG. 8 provide a number of technical benefits. First, these interfaces 802, 804 provide an up-to-date listing of all APIs that are registered with the API registry. This corresponds to a list of all services currently available in the container platform.

Instead of being required to look up documentation, contact a service developer, and/or perform other inefficient tasks for locating a list of available services, a service developer can retrieve and display this information in real-time. Additionally, as services are updated, the API definition files can be updated in a corresponding fashion. This then updates the display illustrated in FIG. 8 to provide up-to-date availability information for each API function.

Figure 9:
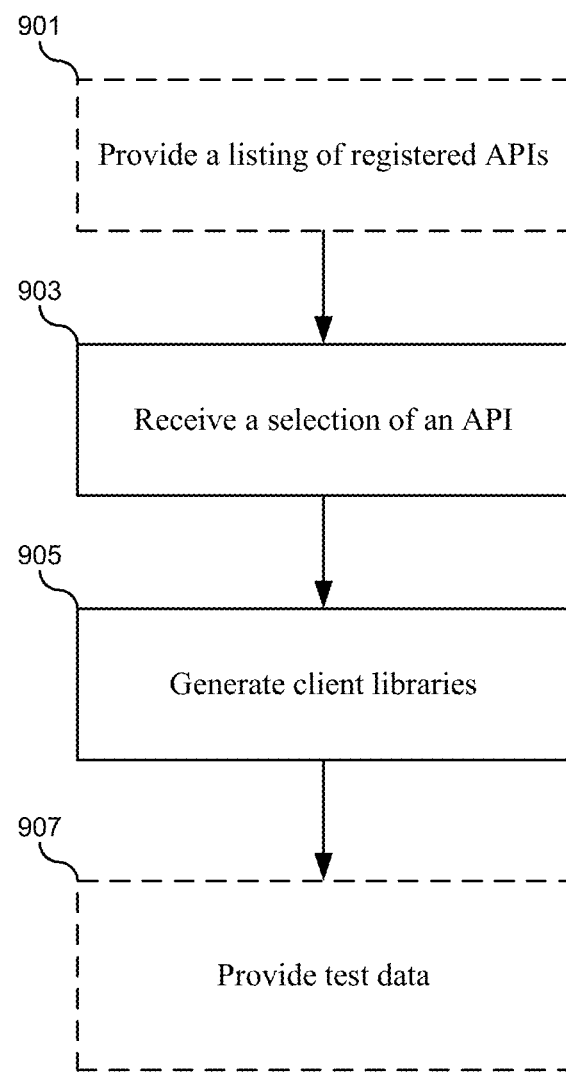
FIG. 9 illustrates a flowchart of a method for using a service and its corresponding function registered with the API registry, according to some embodiments.
Figure 10:
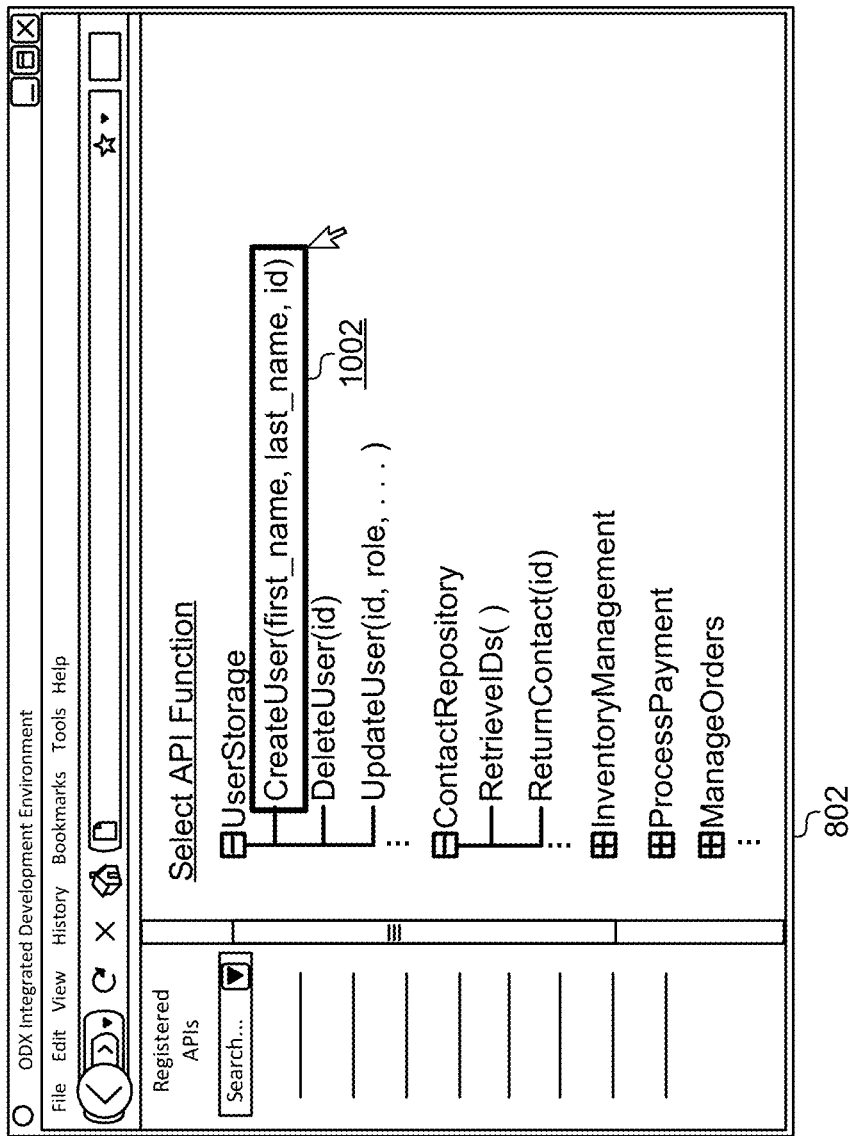
FIG. 10 illustrates how a selection may be received by the API registry through the graphical interface of the CreateUser( )function.

FIG. 9 illustrates a flowchart of a method for using a service and its corresponding function registered with the API registry, according to some embodiments. The method may include providing a listing of registered APIs (901). This step may be omitted in cases where the desired service is already known. However, generally the services can be displayed for browsing and navigation using the interfaces described above in FIG. 8. The method may also include receiving a selection of an API function (901). This selection may be received by the API registry from a developer of the service. For example, a developer may decide to update a database of user records using the CreateUser( ) function described above. FIG. 10 illustrates how a selection 1002 may be received by the API registry through the graphical interface 802 for the CreateUser( ) function. Other embodiments may receive the selection through the command line interface or through other input methods provided by the IDE.

Referring back to FIG. 9, once the selection of an API function is received, the API registry can generate one or more client libraries for the calling service (905). Generating client libraries may provide the calling service with the service endpoint that is dynamically bound to the API function. Specifically, the IDE can generate a set of class objects in the IDE that encapsulate the functionality required to interface directly with the service endpoint in the container platform. In some embodiments, client libraries may include object classes that can be instantiated or used to call member functions that embody the code required to communicate with the service. Examples of these client libraries will be described in greater detail below.

The method may additionally include providing test data (907). When a service is registered with the API registry, it need not be complete. Instead, the service can indicate to the API registry that it is not yet ready to provide functional responses to calling services. In some embodiments, the API definition file that is uploaded to the API registry can include a specification of the type of information that should be returned before the service is functional. When the calling service calls the API function, the client library generated by the API registry can route requests to the API registry instead of the service endpoint. The API registry can then provide a response using dummy, null, or default values. Alternatively, the code within the client libraries themselves can generate the default data to be returned to the calling service.

It should be appreciated that the specific steps illustrated in FIG. 9 provide particular methods of using an API registry according to various embodiments of the present invention. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 11 illustrates an example of a client library generated for a service automatically by the API registry, according to some embodiments. This client library 1102 may correspond to a service that stores user records. This client library 1102 and the corresponding class and service are provided merely by way of example and not meant to be limiting. As described above, each API function and service can specify how client libraries should be generated by virtue of the API definition file uploaded to the API registry. Therefore, the principles described below in relation to the "User" service may be applied to other services.

To represent the User service, the API registry can generate a class for a User. When the calling service requests client libraries to be generated by the API registry, the calling service can specify a programming language being used by the calling service. For example, if the calling service is being written in Java in the IDE, then the API registry can generate class libraries in the Java programming language. Alternatively, if the calling service is being written in C#, then the API registry can generate class libraries in the C #programming language. The User class can be generated to have member functions that correspond to different operations that may be performed through the service endpoint. These member functions can be static such that they do not require an instantiated instance of the User class, or they may be used with instantiated User objects.

In this example, the User service may use a RESTful interface to edit individual user records that are stored by the service. For example, the API registry can generate the CreateUser( )) function to implement a POST call to the User service. One of the functions that can be performed by the class library is to parse, filter, and format data provided as parameters to the API function to be sent as a data packet directly to the service. In this example, the CreateUser( )) function can accept parameters that are formatted for the convenience of the calling service. For example, the calling service may separately store strings for the user first name and the user last. However, the POST command may require a concatenated string of the first name in the last name together. In order to accommodate a user-friendly set of parameters, the client library 1102 can perform a set operations that format the data received as parameters to the function into a format that is compatible with the service endpoint. This may include generating header information, altering the format of certain data fields, concatenating data fields, requesting additional data from other sources, performing calculations or data transforms, and so forth. This may also include packaging the reformatted parameters into a format, such as JSON, XML, etc.

Once the parameters are correctly formatted into a package for the service endpoint, the client library 1102 can also handle the POST call to the service. When the client library is generated, the IP address and port number for the service can be inserted into the CreateUser( ) function to be used in an HTTP request to the service. Note that the details of the HTTP request are encapsulated in the CreateUser( )) function. When a developer for a calling service wants to use the POST function made available by the service, instead of writing the code in the library 1102 themselves, they can instead select the User service from the API registry. The API registry will then automatically generate the client library 1102 that includes the User class. Then, to use the POST function, the service developer can simply use the User.CreateUser("John", "Smith", 2112) function to add the user John Smith to the service.

Figure 12:
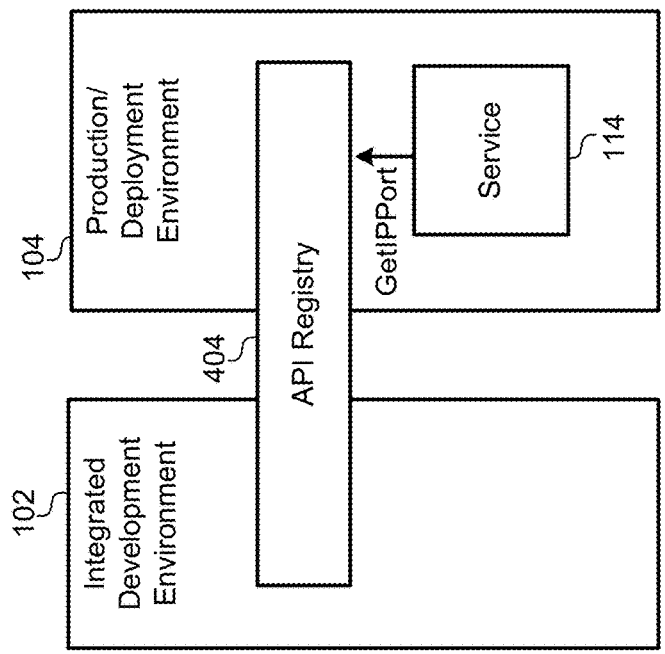
FIG. 12 illustrates an embodiment of a client library that accommodates dynamic binding between service endpoints and API functions, according to some embodiments.

FIG. 12 illustrates an embodiment of a client library 1202 that accommodates dynamic binding between service endpoints and API functions, according to some embodiments. In this example, when the API registry generates the client library 1202, the CreateUser( )) function can include code 1204 that dynamically retrieves the IP address and port number for the service. The calling service 114 can use the GetIPPort( ) function to send a request to the API registry 404 at run time when the calling service 114 is operating in the production/deployment environment 104, such as the container platform. The API registry 404 can access its internal table that is consistently updated to maintain up-to-date bindings between the API functions and the service endpoints. The API registry 404 can then return a current IP address and port number to the calling service 114. The client library 1202 can then insert the IP address and port number into the HTTP POST code that connects to the service. Because the API registry 404 can be accessed at run time by any calling service in the container platform, none of these services need to be updated or patched when the IP address for port number for the service being called changes. Instead, the API registry 404 can provide up-to-date information every time a service is called. In some embodiments, the GetIPPort( )function may only need to call the API registry 404 once an hour, once a day, once a week, and so forth, to minimize the number of function calls made outside of the container for the service 114 under the assumption that the service endpoints do not change frequently in the production environment.

FIG. 13 illustrates an embodiment of a client library 1302 that can marshal additional data to complete an input data set for a service call, according to some embodiments. To simplify using the client library 1302, the client library 1302 may minimize the number of parameters required from the service developer. Additional data that may be required to make the service call can be retrieved from other sources and thus may be omitted from the parameter list. These additional parameters can instead be retrieved directly by the client library 1302 from these other sources. For example, creating a new user may include specifying a user role for the user. Instead of requiring the service developer to provide a user role as one of the parameters, the client library 1302 can instead include code 1304 that automatically retrieves a role for the user from some other source. In this example, the user role can be retrieved from a database, from another service in the container platform, or from another class storing user roles within the calling service. In any of these cases, the code 1304 can automatically retrieve the user role and package it as part of the input data for the HTTP POST command sent to the service.

In addition to marshaling and formatting data for inputs to the service, the client library 1302 can also parse and return data received from the service and handle error conditions. In this example, the POST command may return a data packet into the Result variable. Often times, a service may return a data packet that includes more information than the calling service needs. Therefore, the client library 1302 can parse the data fields in the Result variable and extract, format, and package data from the Result variable into a format that is more usable and expected by the User class. In this example, the code 1306 can extract fields from the Result variable and use them to create a new User object that is returned from the API function. In another example using a GET command, individual API functions can be generated in the User class that extract different fields from the Result variable from the GET command. For example, the User class could provide a GetFirstName(id) function, a GetLastName(id) function, a GetRole(id) function, and so forth.

Each of these functions may include very similar code while returning different fields from the Result variable.

In addition to parsing results, the client library 1302 may also generate code 1308 that handles error conditions associated with using the service. In this example, the code 1308 can test a status field in the Result variable to determine whether the POST command was successful. If the command was successful, then the CreateUser( )) function can return a new User object. In cases where the Post command failed, the function can instead return a null object and/or retry the call to the service.

FIG. 14 illustrates a client library 1402 that can handle retries when calling a service, according to some embodiments. Like the example of FIG. 13, the client library 1402 uses a status in a Result variable populated by the POST HTTP call to determine whether the call was successful or not. While the result is unsuccessful, the client library 1402 can continue to retry until the call is successful. Some embodiments may use a counter or other mechanism to limit the number of retries or add a wait time between retries.

Figure 15A:
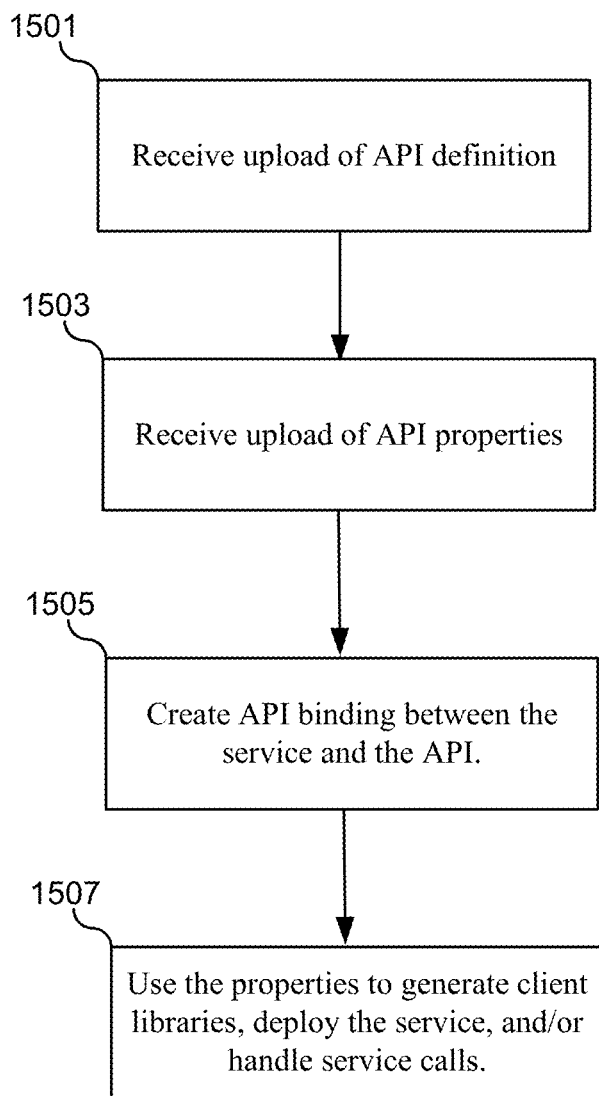
FIG. 15A illustrates a method of providing API properties to the API registry, according to some embodiments.

As described above, some embodiments may also upload a set of API properties to the API registry along with the API definition. FIG. 15A illustrates a method of providing API properties to the API registry, according to some embodiments. The method may include receiving an upload of an API definition (1501). The method may also include receiving an upload of API properties (1503). The upload of properties may be part of the same transmission as the upload of the API definition. In some embodiments, the API properties may be part of the API definition. In some embodiments, the API properties may be one or more flags or predefined data fields that are checked to indicate that property should be set by the API registry. In some embodiments, the API properties need not conform to any pre-structured format, but can instead be represented by instruction code that causes the API registry to implement the features described below, such as authentication, encryption, and so forth. The API properties can be stored along with the API definition for each service.

The method may additionally include creating the API binding between the service and the API (1505). This operation may be performed as described in detail above. Additionally, the method may include using the API properties to perform one or more operations associated with the service (1507). The API properties may be used at different phases during the lifecycle of the service. Generally, this may be described as using the API properties to implement a function associated with the property during the deployment of a service, when generating client libraries for service, and/or when calling service. Examples of each of these functions will be described below in greater detail.

It should be appreciated that the specific steps illustrated in FIG. 15A provide particular methods of providing API properties to an API registry according to various embodiments of the present invention. Other sequences of steps may also be performed according to alternative embodiments. For example, alternative embodiments of the present invention may perform the steps outlined above in a different order. Moreover, the individual steps illustrated in FIG. 15A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 15B:
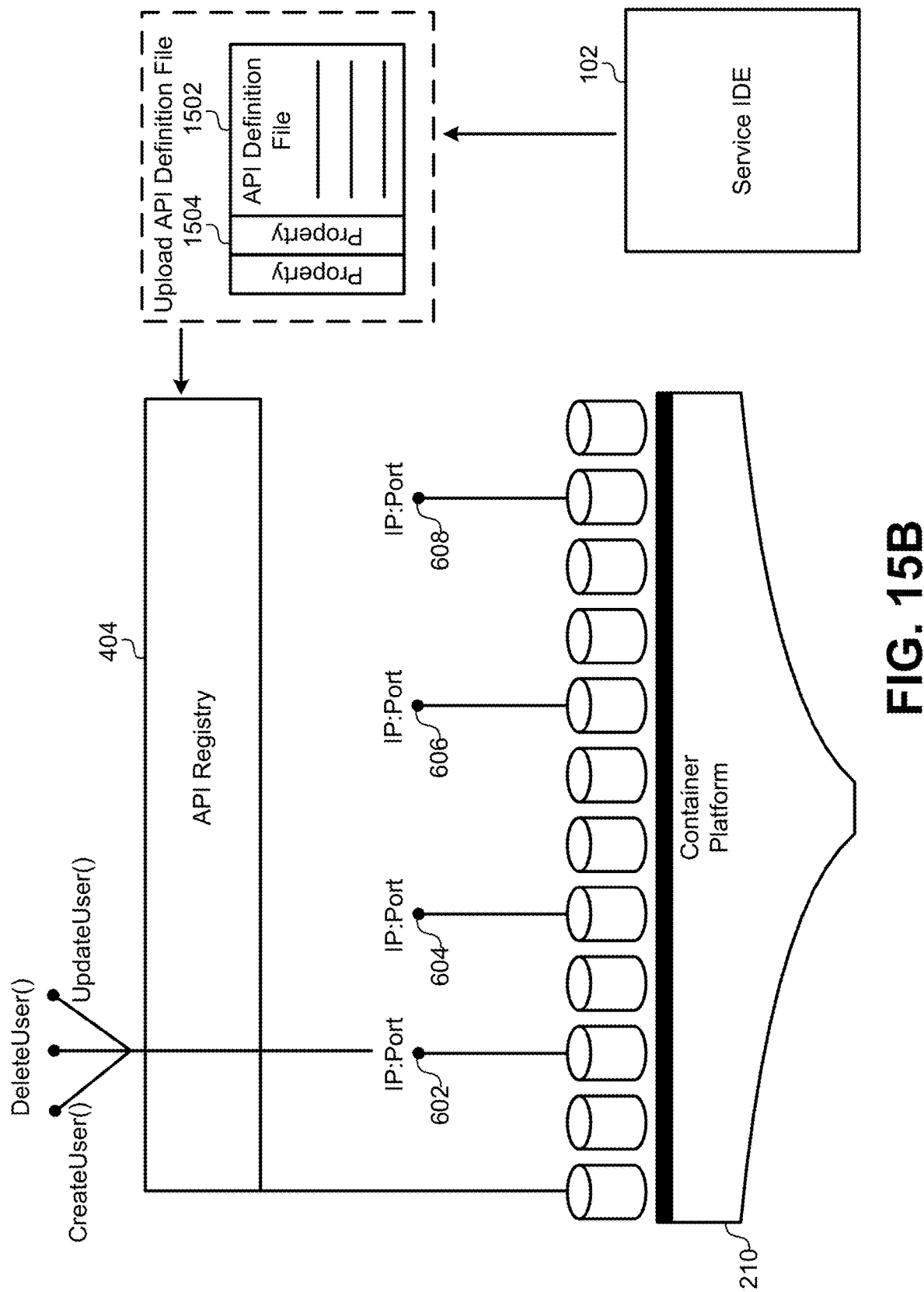
FIG. 15B illustrates a hardware/software diagram of how a service can provide API properties to the API registry, according to some embodiments.

FIG. 15B illustrates a hardware/software diagram of how a service can provide API properties to the API registry, according to some embodiments. While developing a service in the IDE 102, a service developer can provide the API definition file 1502 and one or more properties 1504 to the API registry 404. Because the API registry 404 is accessible in both the IDE 102 and the container platform at runtime, the API registry 404 can store the properties 1504 and use them to affect how a service is deployed, called, and/or used to generate client libraries during both development and runtime scenarios.

Figure 16:
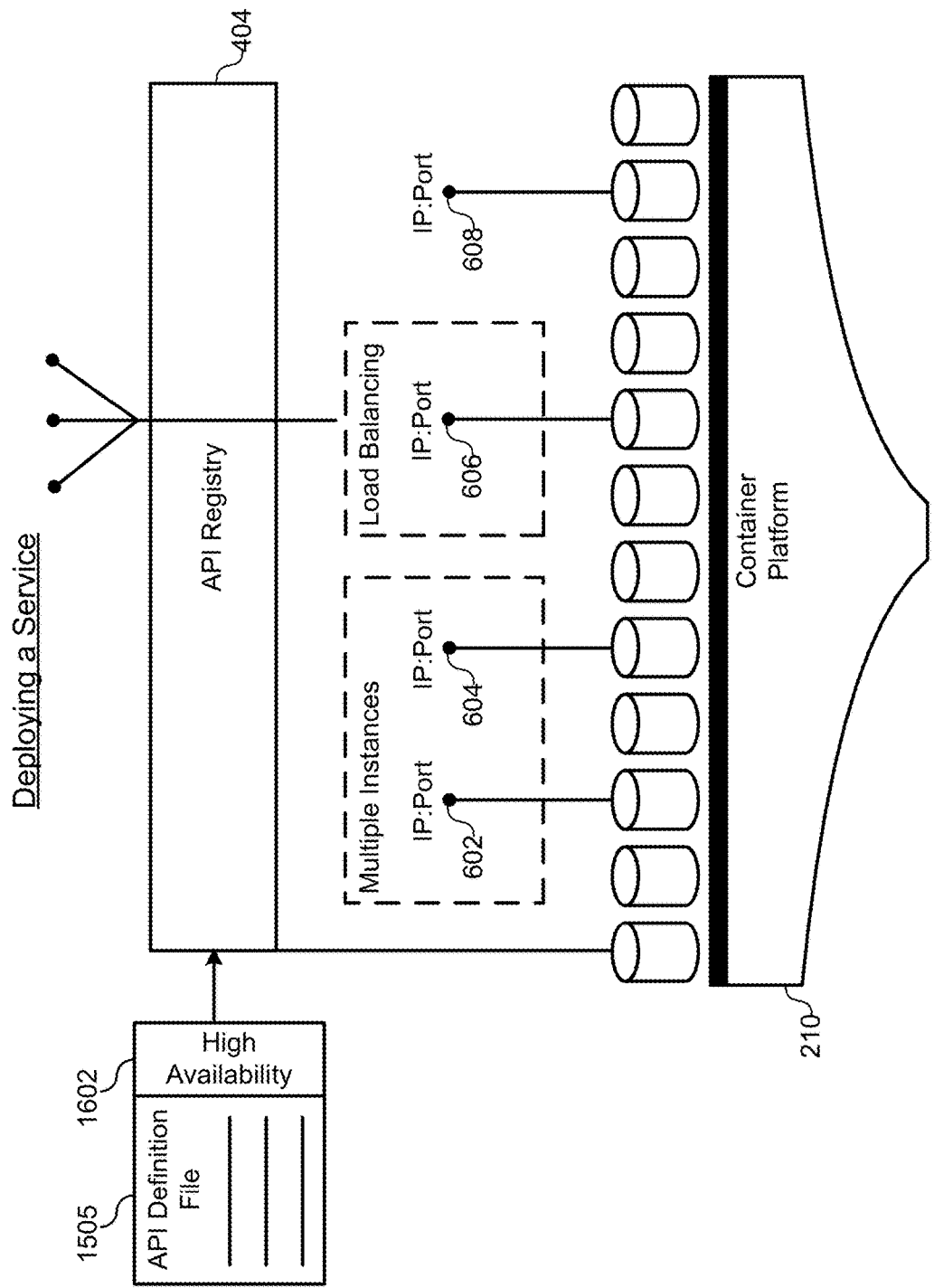
FIG. 16 illustrates a hardware/software diagram where a property is used by the API registry to deploy a service with high availability, according to some embodiments.

FIG. 16 illustrates a hardware/software diagram where a property is used by the API registry to deploy a service with high availability, according to some embodiments. In addition to the API definition file 1505 for a particular service, the API registry 404 may receive a property 1602 indicating that the service should be deployed to be very resilient, or have high availability. This property 1602 may be received as a set of instructions that are executed by the API registry 404 to deploy the service to have high availability. This option allows the developer to define what it means to be "high-availability" for this service. For example, the property 1602 may include instructions that cause the API registry 404 to deploy multiple instances 602, 604 of the service to the container platform 210. By executing these instructions, the API registry 404 does not need to make any decisions or determinations on its own, but can instead simply execute the deployment code provided as part of the property 1602.

The property 1602 may also be received as a flag or setting that indicates to the API registry 404 an option to execute existing instructions at the API registry 404 for deploying the service with high availability. With this option, the API registry 404 need not receive any code to be executed as the property 1602. Rather, the API registry 404 can recognize the high-availability property 1602 and execute code that is maintained in the API registry 404 to deploy multiple instances 602, 604 of the service. This allows the API registry 404 to define what it means to be "high-availability" for the deployment of any service that is registered with the API registry 404.

Because the API registry 404 is connected to the runtime environment of the container platform 210, the API registry 404 can interact with the container platform 210 to deploy the instances 602, 604 that determine the runtime availability of the service. Note that the two instances 602, 604 of the service illustrated in FIG. 16 are provided merely as an example and not meant to be limiting. A high-availability service may include more than two redundant instances of a service being deployed to the container platform.

Some embodiments may include code in the API registry 404 that can be executed as a default. If the property 602 includes only a simple indication that high availability is desired, the API registry 404 can execute its own code. If the property 602 includes deployment code for deploying the service, the API registry 404 can instead execute the code of the property 1602. In some cases, the property 1602 may include only a portion of the code needed to deploy the service with high-availability. The API registry 404 can execute the portions of the code that are provided by the property 1602, then execute any code not provided by the property 1602 using the code at the API registry 404. This allows developers to overwrite an existing definition of how to execute a property, such as high-availability, at the API registry 404, while still allowing the API registry 404 to provide a uniform definition for executing properties that can be used by registered services.

In some embodiments, a high-availability property may also cause the container platform 210 to deploy a load balancing service 606 that distributes requests to the multiple instances 602, 604 of the service. The endpoint of the load balancing service 606 can be registered with the API registry 404 and made available to other services. Alternatively or additionally, each of the multiple instances of the service 602, 604 may be registered with the API registry 404 as service endpoints.

In each of the examples described below, the same principles discussed in relation to FIG. 16 may apply. For example, any property described below may be accompanied with code that may be received by the API registry 404 and used to overrule code that would otherwise be executed by the API registry 404. Prior to this disclosure, no method existed for creating a uniform default for executing properties while simultaneously allowing service developers to overrule those properties if needed. Therefore, the API registry 404 solves a technical problem by allowing code to be executed at the API registry 404 as a default while still allowing that code to be overruled by a property 1602 received from a developer.

Figure 17:
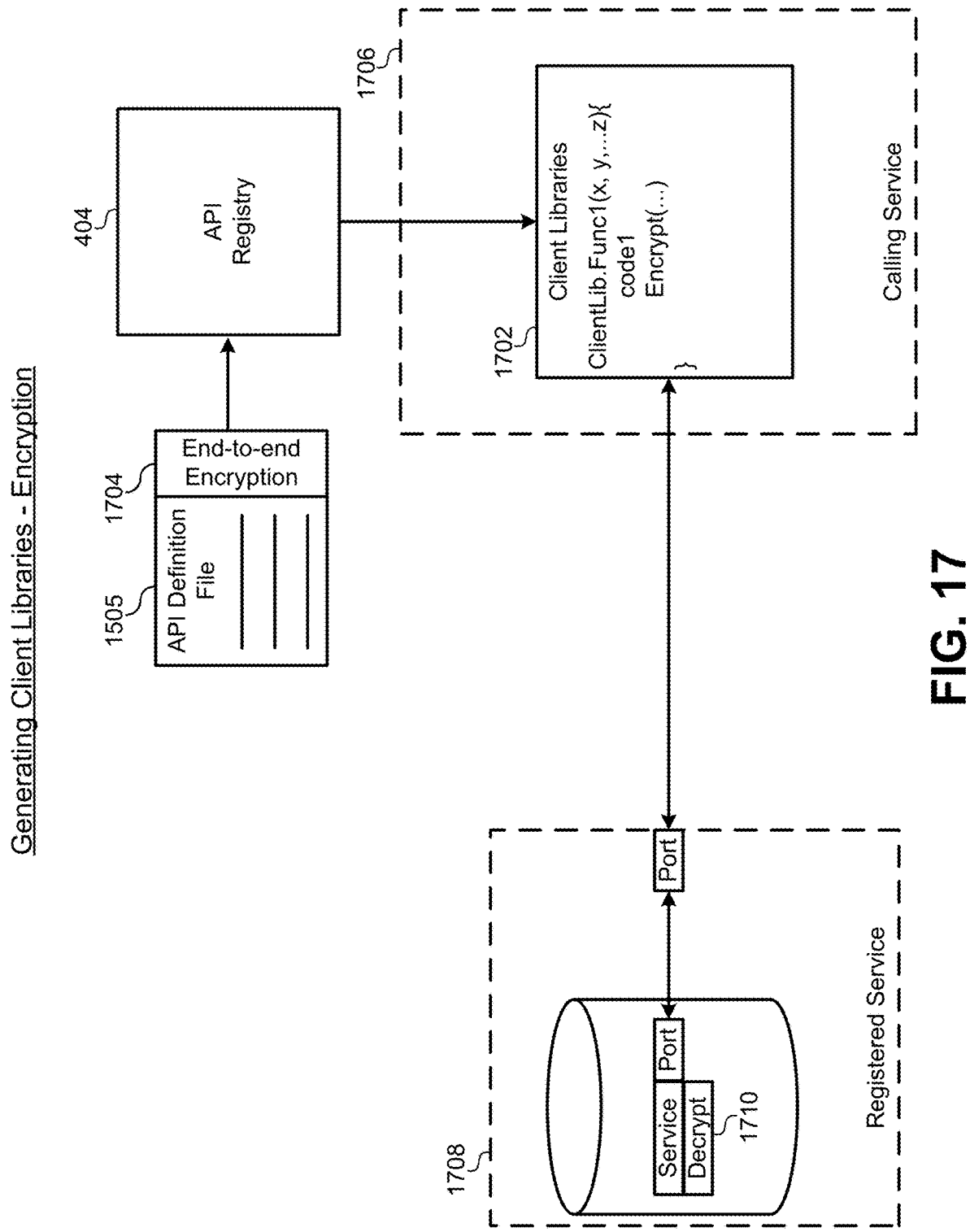
FIG. 17 illustrates a hardware/software diagram of a property that enforces end-to-end encryption through the API registry, according to some embodiments.

FIG. 17 illustrates a hardware/software diagram of a property that enforces end-to-end encryption through the API registry, according to some embodiments. Along with the API definition file 1505, the API registry 404 may receive a property 1704 that indicates, or includes code that generates, end-to-end encryption for calling the service 1708. During development, the service 1708 can include its own decryption/encryption code 1710 that causes packets received by the service 1708 to be decrypted and packets returned by the service 1708 to be encrypted. Prior to this disclosure, the developer would need to provide a specification that indicated users of the service 1708 needed to provide encryption to be compatible with the service 1708. This embodiment solves a technical problem by allowing the service 1708 to dictate how the client libraries are generated in a calling service 1706, which ensures compatibility with the encryption of the service 1708.

In some embodiments, the developer of the service 1708 need not include the encryption/decryption code 1710 in the service 1708. Instead, the property 1704 can simply instruct the API registry 404 to enforce end-to-end encryption for the service 1708. When the service 1708 is deployed to the container platform 210, the API registry 404 can cause the encryption/decryption code 1710 to be inserted into the service 1708 when it is deployed. This allows the developer to select between different encryption regimes based on the property 1704 and/or to allow the API registry 404 to select a preferred encryption regime as a default.

End-to-end encryption requires not only the encryption/decryption code 1710 to be inserted into the service 1708 when it is deployed or during development, but it also requires that a calling service 1706 also includes compatible encryption/decryption code. As described above, when the calling service 1706 needs to use the service 1708, the API registry 404 can generate one or more client libraries 1702 that completely implement the code needed to interact with the service 1708 in a simple and efficient manner. When this client library 1702 is generated, the API registry 404 can analyze the property 1704 to determine an encryption regime used by the service 1708. Then, based on that property 1704, the API registry 404 can cause a compatible encryption/decryption code to be added to the client library 1702 for the calling service 1706. Thus, when the calling service 1706 sends a request to the service 1708, the information may be encrypted at the calling service 1706 and decrypted once received by the service 1708. Similarly, the service 1708 can encrypt a response before it is sent to the calling service 1706, which can then decrypt the response before passing the response outside of the client library 1702. This causes the entire encryption process to be entirely transparent to a developer of the calling service 1706. Instead of being required to implement a compatible encryption/decryption regime when calling the service 1706, the property 1704 may ensure that the API registry 404 has already generated the encryption/decryption code in the client library 1702 to be compatible and implement the end-to-end encryption property.

Figure 18:
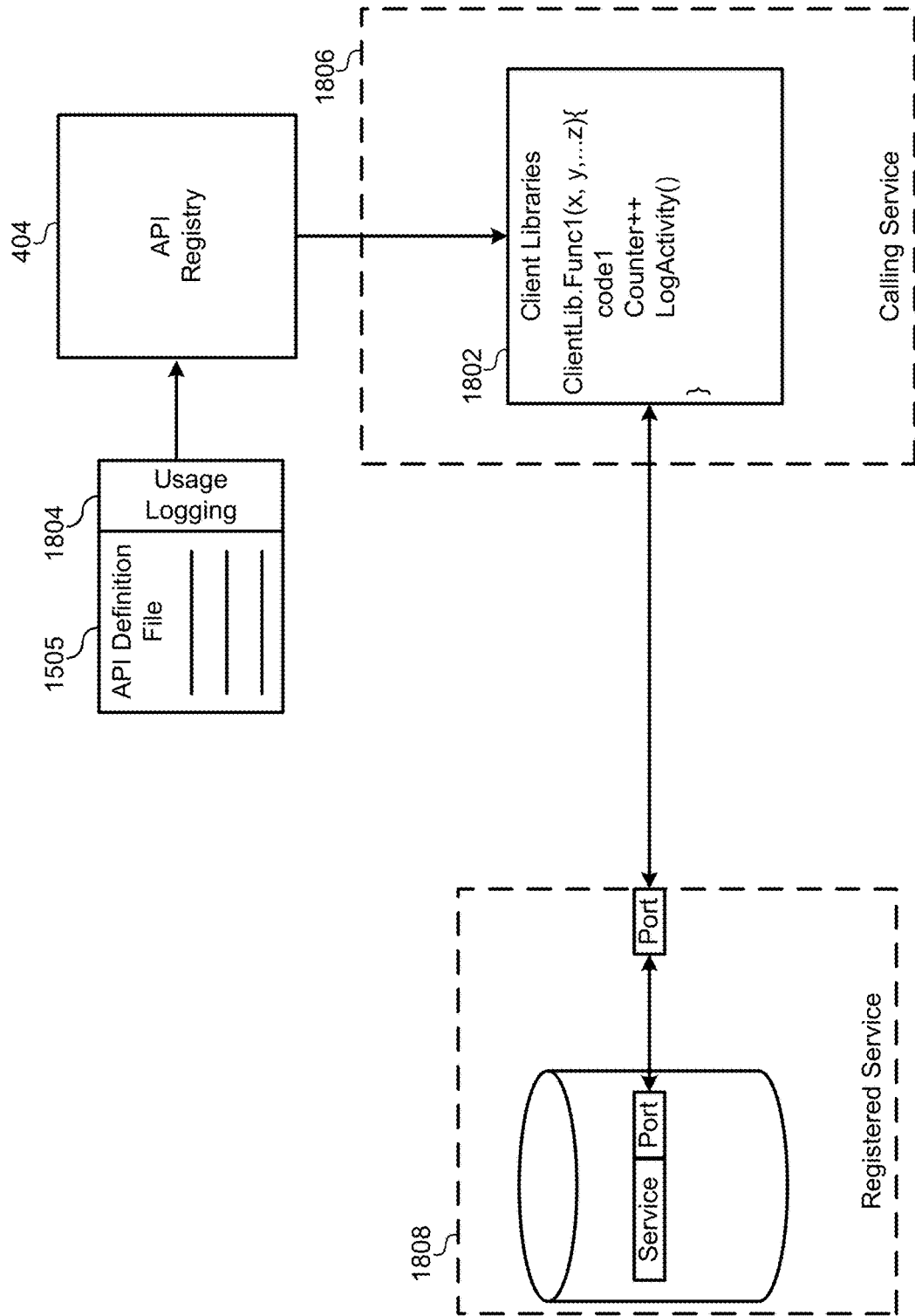
FIG. 18 illustrates a property for an API registry to implement usage logging for a service 1808, according to some embodiments.

FIG. 18 illustrates a property 1804 for an API registry to implement usage logging for a service 1808, according to some embodiments. Prior to this disclosure, to monitor and log the frequency, source, success rate, etc., of requests to a service, the service itself had to log this information. Alternatively, the container environment had to monitor the service and log its usage information. Logging information at the service 1808 itself is terribly inefficient, and slows down the throughput for every request handled by the service. Similarly, the overhead of requiring the container platform to monitor and log all the calls made to particular services also represents a tremendous overhead to the scheduling and orchestration of container services. This embodiment solves this technical problem by inserting code directly into client libraries for services that call the service 1808. This allows the usage of the service 1808 to be logged and monitored without affecting the performance of the service 1808 at all in terms of memory usage or CPU usage.

In addition to the API definition file 1505, the API registry 404 can receive a property 1804 that indicates, or includes code that implements, usage logging 1804. When a developer of a calling service 1806 desires to submit requests to the service 1808, the API registry 404 can automatically generate a client library 1802 that includes code for logging activity related to the service 1808. As described above, this code can be generated based on default code maintained and executed by the API registry 404, or can be generated by code received with the property 1804 and executed by the API registry 404.

The code for logging activity in the client library 1802 may include counters that are incremented every time the service 1808 is called, functions that cause activity to be logged to a log file when the service 1808 is called, and other functions that monitor and record characteristics of the requests sent to the service 1808 and responses received from the service 1808. Depending on the particular embodiment, this code may monitor many different types of characteristics associated with requests made of the service 1808. For example, some embodiments may log the total number of calls made to the service 1808. Some embodiments may log a success rate for responses received from the service 1808. Some embodiments may log types of data that are sent in requests to the service 1808. Some embodiments may log times of day or other external information for when the service 1808 is called. Some embodiments may log input and output packets to/from the service 1808 that can be used for debugging the service 1808. Some embodiments may log any or all of these characteristics in any combination and without limitation.

Figure 19:
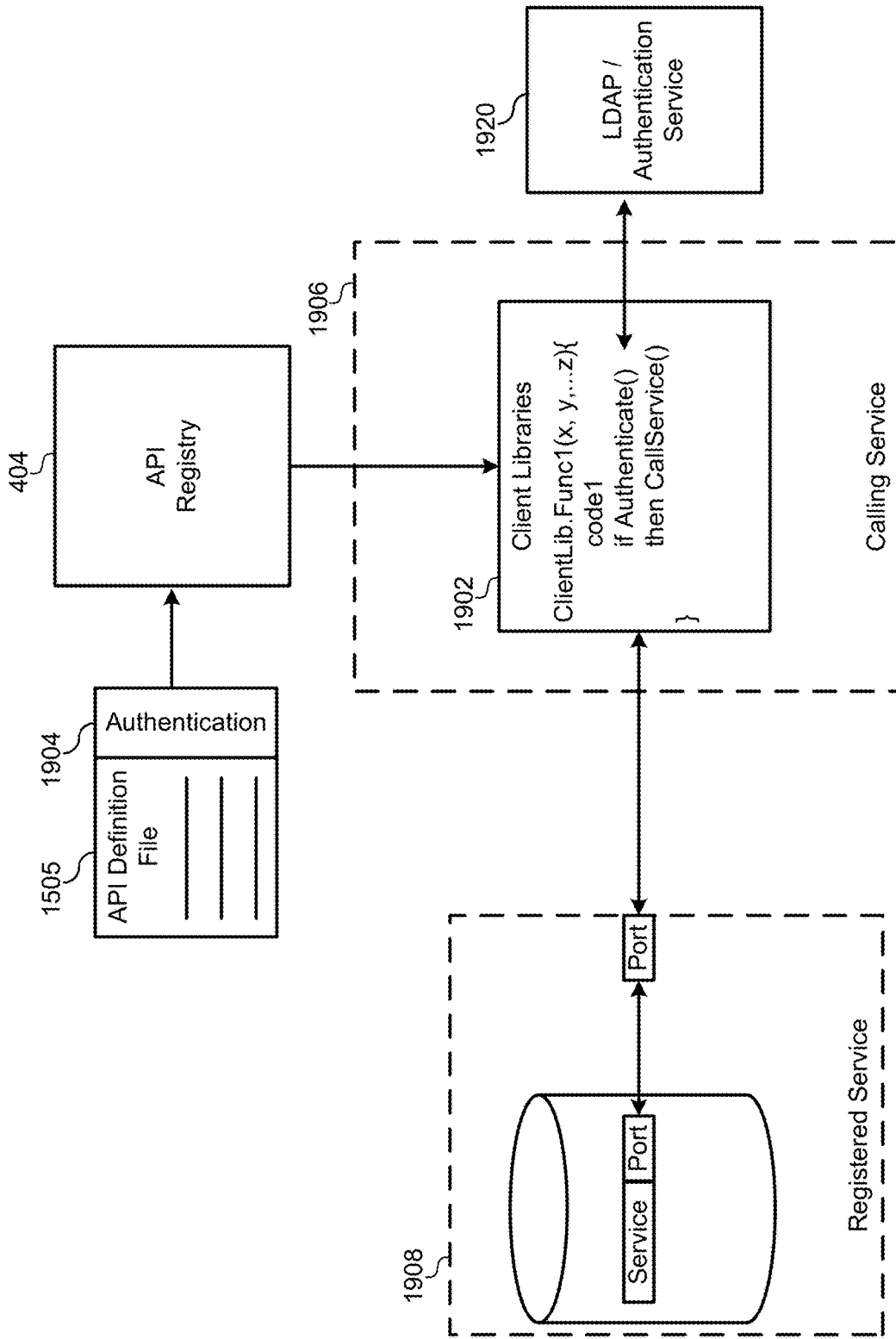
FIG. 19 illustrates a hardware/software diagram of a property that can enforce an authentication protocol for a service, according to some embodiments.

FIG. 19 illustrates a hardware/software diagram of a property 1904 that can enforce an authentication protocol for a service 1908, according to some embodiments. Some services may require that a user identity be authenticated and that the user be authorized to use the service before responding to a request. Prior to this disclosure, a technical problem existed where the authentication and authorization procedures took place at the service 1908 itself. This added overhead in terms of memory usage and CPU usage for every call received by the service 1908, and increased the latency of the service in response. This in turn decreased throughput, and limited the number of requests that could be processed by the service 1908 during any given time interval. These embodiments solve this technical problem by moving authentication/authorization code to the client library 1902 that is automatically generated by the API registry 1404.

When a calling service 1906 wants to use the service 1908, the API registry 404 can generate the client library 1902 that includes code for performing the authorization and/authentication. In some embodiments, this may include contacting external authentication/authorization services 1920 that specifically verify user identities and/or determine whether a user is authorized to use the service 1908. The external authentication/authorization services 1920 may include an access manager, a Lightweight Directory Access Protocol (LDAP) manager, an Access Control List (ACL), a network authentication protocol manager, and so forth. The code in the client library 1902 can then send the call to the service 1908 when the authentication/authorization procedure is successful.

By offloading the authentication/authorization enforcement to the API registry 404 and the client library 1902, this code can be completely eliminated from the service 1908. Because significant delays may often accompany interacting with the external authentication/authorization services 1920, this delay can be removed from the service 1908 to increase throughput. Additionally, rather than hard coding the authentication/authorization enforcement into the service 1908, the developer of the service 1908 can instead simply select a predefined authentication/authorization regime using the property 1904 that is sent to the API registry 404. The API registry 404 can maintain a predefined list of authorization/authentication with the accompanying implementation code for the client library 1902. This also prevents the calling service 1906 from sending requests to the service 1908 that cannot be authorized and/or authenticated. Instead, if the authentication and/or authorization routine is unsuccessful, the call can be aborted at the client library 1902. This ensures that the service 1908 only receives requests that are authenticated and/or authorized.

Another technical improvement provided by the API registry 404 is the ability to upgrade any of the functionality provided by the properties 1904 without being required to change any of the code of any registered services. For example, because the authentication/authorization code has been offloaded to the client library 1902 generated by the API registry 1404, the client library 1902 can be updated to change the authentication/authorization regime. None of the code in the calling service 1906 or the service 1908 needs to be modified. Because code is only changed in a single place, this greatly reduces the probability of code integration errors that would otherwise accompany distributed patches sent out to every individual service.

Figure 20:
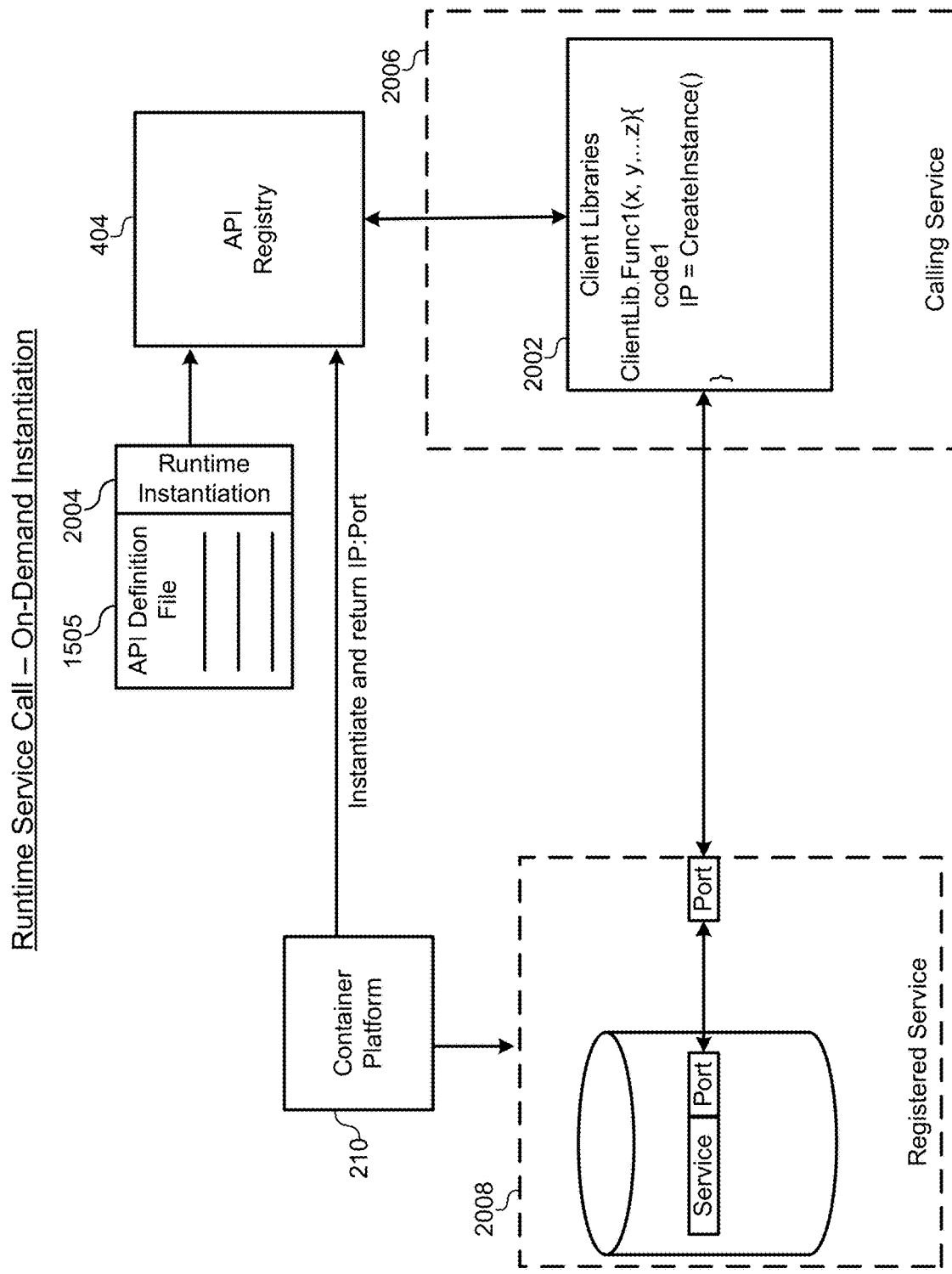
FIG. 20 illustrates a hardware/software diagram for a property that enables runtime instantiation of a service, according to some embodiments.

FIG. 20 illustrates a hardware/software diagram for a property 2004 that enables runtime instantiation of a service, according to some embodiments. Some services may be rarely used or only used during predefined time intervals. Therefore, deploying a service to the container platform need not always result in actually instantiating an instance of the service in a container that is immediately available. In contrast to virtual machines, containers can be instantiated and activated very quickly. Therefore, a service developer may desire to only have the service instantiated when it is called. A service developer may also desire to only have the service instantiated within a predefined time interval. Similarly, the service developer may specify that the service instance should be deleted after a predefined time interval of inactivity.

In addition to receiving the API definition file 1505, the API registry 404 can receive a property 2004 that specifies run-time instantiation or other instantiation parameters. For example, the property may include a specification of one or more time intervals during which the service 2008 should be instantiated after deployment. In another example, the property may include an indication that the service 2008 should only be instantiated on demand. In another example, the property may specify a timeout interval after which the instantiated service 2008 should be deleted from the container platform.

When a calling service 2006 wants to use the service 2008, the API registry 404 can generate code in the client library 2002 that handles the run-time instantiation of the service 2008. For example, the CreateInstance( ) function call in the client library 2002 can create a call to the API registry 404. The API registry can then interact with the container platform 210 to determine whether an operating instance of the service 2008 is available. If not, the API registry 404 can instruct the container platform 210 to instantiate an instance of the service 2008 in a container in the container platform 2010. The container platform 210 can then return the endpoint (e.g., IP address and port number) to the API registry 404. The API registry 404 can then create a binding between that endpoint and the API function call created in the client library 2002. API registry 404 can then return the endpoint to the client library 2002 which can be used to create the direct connection between the calling service 2006 and the newly instantiated service 2008.

For services that should only be instantiated during predefined time intervals, the API registry 404 may establish a table of instantiation and deletion times for certain services. Based on these stored instantiation/deletion times, the API registry 404 can instruct the container platform 210 to instantiate or delete instances of the service 2008. The API registry 404 can also specify a number of instances that should be instantiated during these predefined intervals. For example, from 5:00 PM to 10:00 PM the property 2004 may specify that at least 10 instances of the service 2008 are active on the container platform 210. When this time interval occurs, the API registry 404 can instruct the container platform 210 to create the additional instances.

Figure 21:
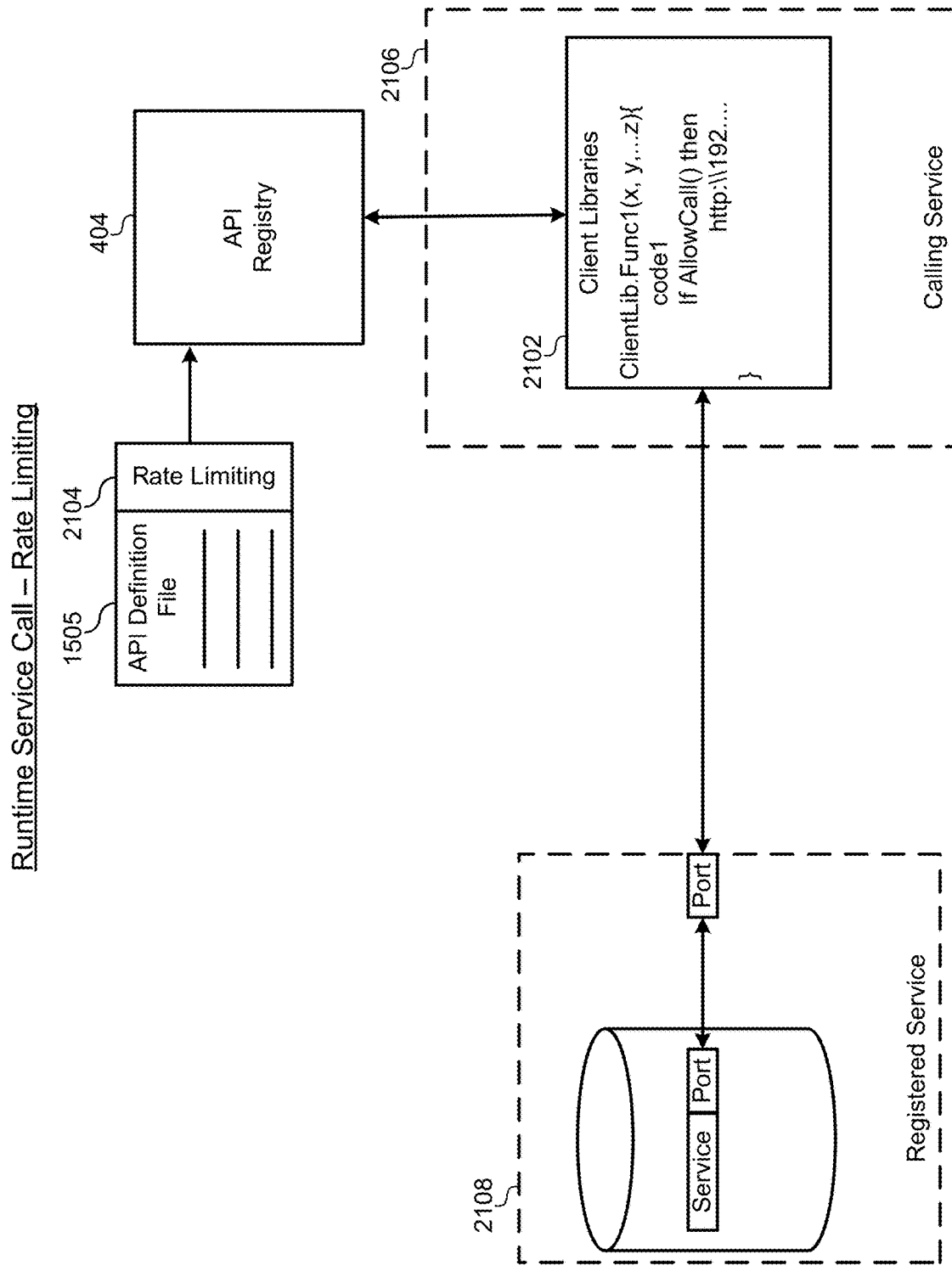
FIG. 21 illustrates a hardware/software diagram of a property that implements a rate limiting function for a service, according to some embodiments.

FIG. 21 illustrates a hardware/software diagram of a property 2104 that implements a rate limiting function for a service 2108, according to some embodiments. Some services may need to limit the rate at which requests are received. Other services may need to limit requests from certain senders or types of services. Prior to this disclosure, this function had to be performed by the service itself by determining a source for each request, comparing the source to a whitelist/blacklist, and throttling the rate at which it serviced these requests. As with most of the examples described above, placing this overhead in the service itself increase the amount of memory and CPU power used by the service and limited the throughput of the service. These embodiments solve this technical problem by automatically generating the rate limiting code in the client library generated by the API registry. This allows the service to specify rate limiting by virtue of the property 2104 without requiring the service 2108 to implement that functionality with all of its associated overhead.

When a calling service 2106 wants to send requests to the service 2108, the API registry 404 can automatically generate the client library 2102 that includes rate limiting code. When the client library 2102 is generated, the API registry 404 can determine whether the particular service 2106 should be rate limited. If not, the client library 2102 can be generated as usual. If the API registry 404 determines that the calling service 2106 should be rate limited (e.g., by comparison to a whitelist/blacklist), then the API registry 404 can insert code in the client library 2102 that adds delays, adds counters, and/or otherwise implements the rate limiting function to ensure that a predefined maximum number of requests are made by the calling service 2106 in any given time interval according to a predefined rate. This code may also implement time windows during which the rate limiting function will be active. This allows the service 2108 to enforce rate limiting during high-traffic intervals automatically.

Each of the methods described herein may be implemented by a specialized computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output. Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 22:
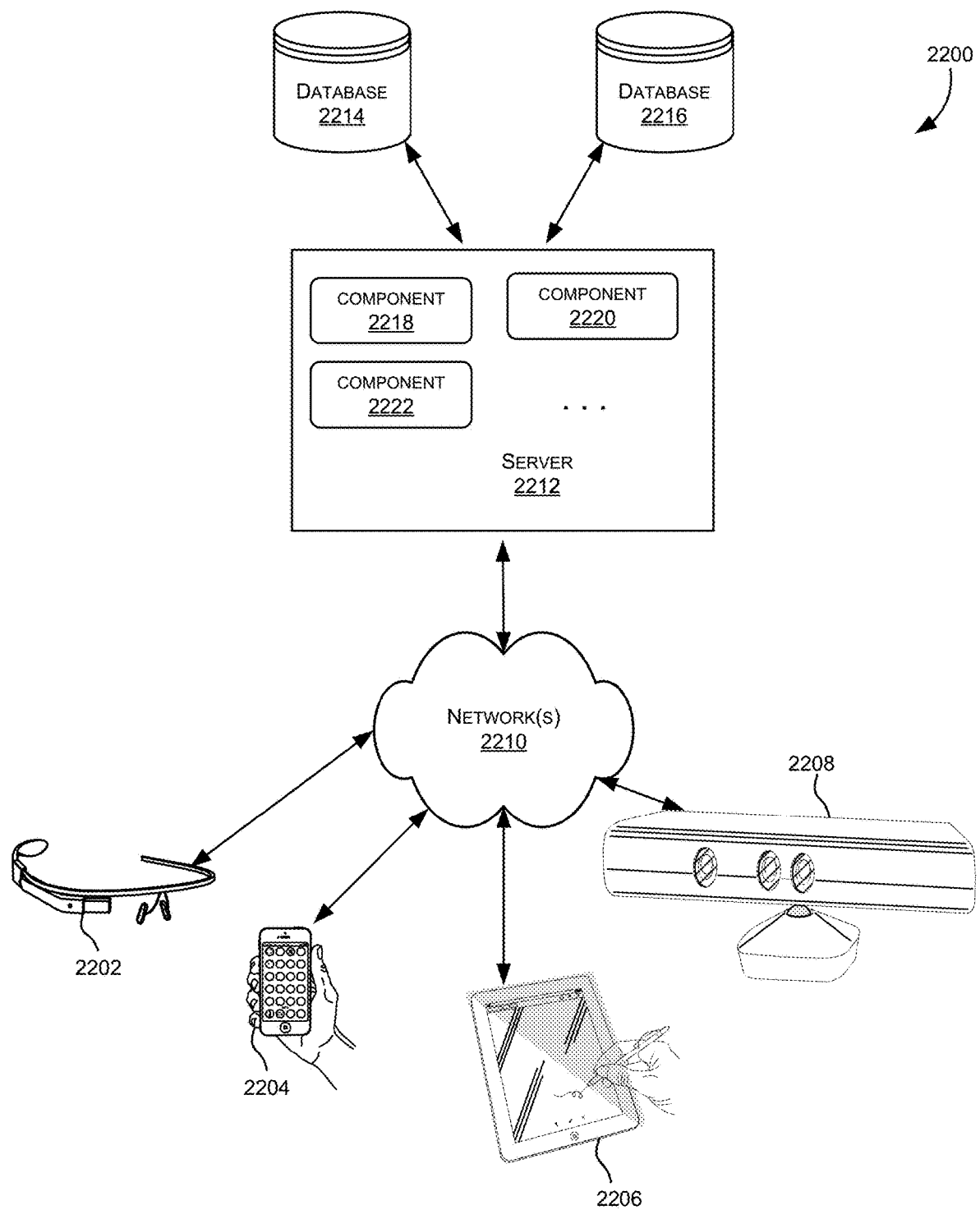
FIG. 22 illustrates a simplified block diagram of a distributed system for implementing some of the embodiments.

FIG. 22 depicts a simplified diagram of a distributed system 2200 that may interact with any of the embodiments described above. In the illustrated embodiment, distributed system 2200 includes one or more client computing devices 2202, 2204, 2206, and 2208, which are configured to execute and operate a client application such as a web browser, proprietary client (e.g., Oracle Forms), or the like over one or more network(s) 2210. Server 2212 may be communicatively coupled with remote client computing devices 2202, 2204, 2206, and 2208 via network 2210.

In various embodiments, server 2212 may be adapted to run one or more services or software applications provided by one or more of the components of the system. In some embodiments, these services may be offered as web-based or cloud services or under a Software as a Service (SaaS) model to the users of client computing devices 2202, 2204, 2206, and/or 2208. Users operating client computing devices 2202, 2204, 2206, and/or 2208 may in turn utilize one or more client applications to interact with server 2212 to utilize the services provided by these components.

In the configuration depicted in the figure, the software components 2218, 2220 and 2222 of system 2200 are shown as being implemented on server 2212. In other embodiments, one or more of the components of system 2200 and/or the services provided by these components may also be implemented by one or more of the client computing devices 2202, 2204, 2206, and/or 2208. Users operating the client computing devices may then utilize one or more client applications to use the services provided by these components. These components may be implemented in hardware, firmware, software, or combinations thereof. It should be appreciated that various different system configurations are possible, which may be different from distributed system 2200. The embodiment shown in the figure is thus one example of a distributed system for implementing an embodiment system and is not intended to be limiting.

Client computing devices 2202, 2204, 2206, and/or 2208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 2202, 2204, 2206, and 2208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 2210.

Although exemplary distributed system 2200 is shown with four client computing devices, any number of client computing devices may be supported. Other devices, such as devices with sensors, etc., may interact with server 2212.

Network(s) 2210 in distributed system 2200 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 2210 can be a local area network (LAN), such as one based on Ethernet, Token-Ring and/or the like. Network(s) 2210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 2212 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 2212 may be adapted to run one or more services or software applications described in the foregoing disclosure. For example, server 2212 may correspond to a server for performing processing described above according to an embodiment of the present disclosure.

Server 2212 may run an operating system including any of those discussed above, as well as any commercially available server operating system. Server 2212 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 2212 may include one or more applications to analyze and consolidate data feeds and/or event updates received from users of client computing devices 2202, 2204, 2206, and 2208. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 2212 may also include one or more applications to display the data feeds and/or real-time events via one or more display devices of client computing devices 2202, 2204, 2206, and 2208.

Distributed system 2200 may also include one or more databases 2214 and 2216. Databases 2214 and 2216 may reside in a variety of locations. By way of example, one or more of databases 2214 and 2216 may reside on a non-transitory storage medium local to (and/or resident in) server 2212. Alternatively, databases 2214 and 2216 may be remote from server 2212 and in communication with server 2212 via a network-based or dedicated connection. In one set of embodiments, databases 2214 and 2216 may reside in a storage-area network (SAN). Similarly, any necessary files for performing the functions attributed to server 2212 may be stored locally on server 2212 and/or remotely, as appropriate. In one set of embodiments, databases 2214 and 2216 may include relational databases, such as databases provided by Oracle, that are adapted to store, update, and retrieve data in response to SQL-formatted commands.

Figure 23:
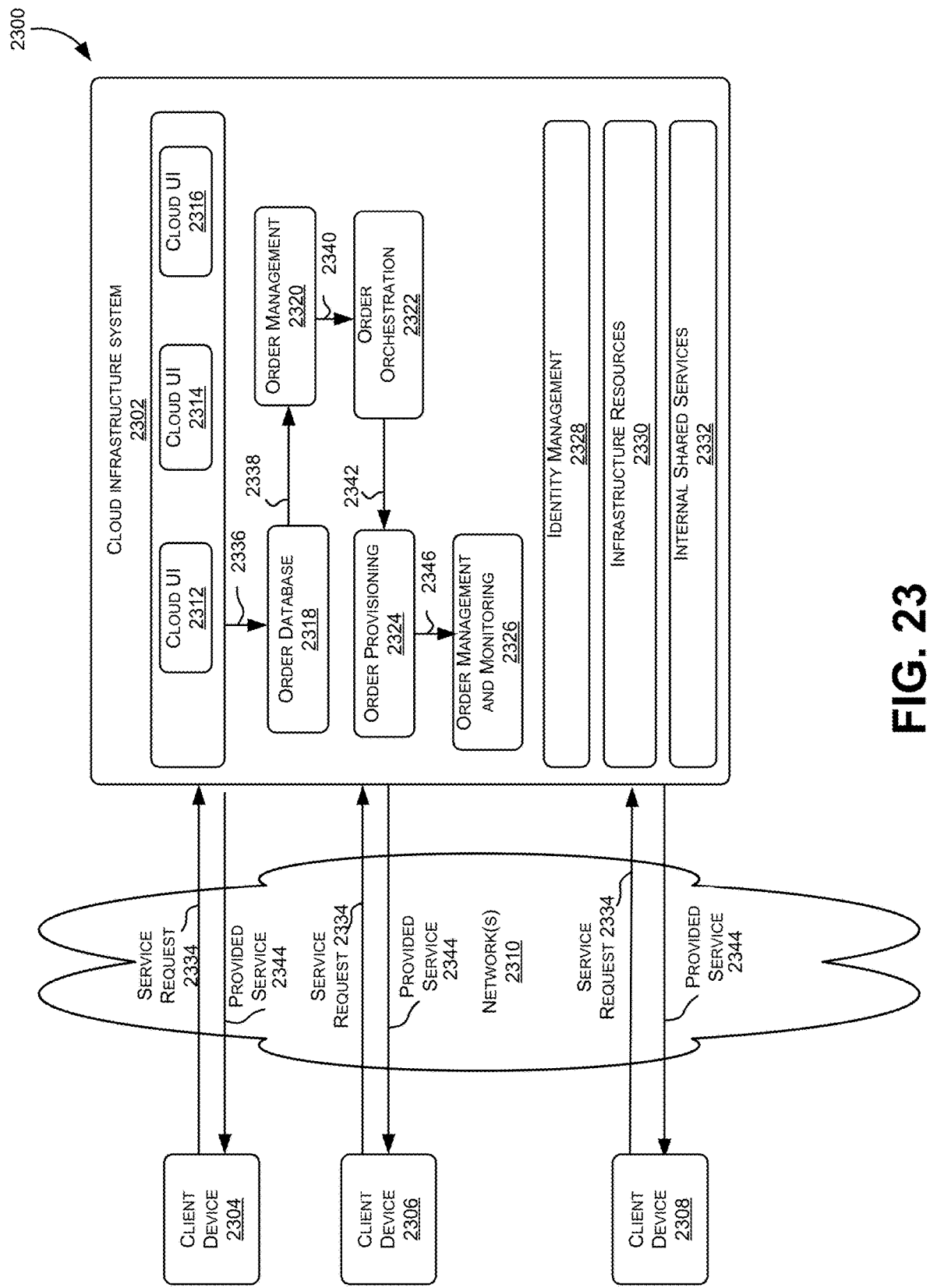
FIG. 23 illustrates a simplified block diagram of components of a system environment by which services provided by the components of an embodiment system may be offered as cloud services.

FIG. 23 is a simplified block diagram of one or more components of a system environment 2300 by which services provided by one or more components of an embodiment system may be offered as cloud services, in accordance with an embodiment of the present disclosure. In the illustrated embodiment, system environment 2300 includes one or more client computing devices 2304, 2306, and 2308 that may be used by users to interact with a cloud infrastructure system 2302 that provides cloud services. The client computing devices may be configured to operate a client application such as a web browser, a proprietary client application (e.g., Oracle Forms), or some other application, which may be used by a user of the client computing device to interact with cloud infrastructure system 2302 to use services provided by cloud infrastructure system 2302.

It should be appreciated that cloud infrastructure system 2302 depicted in the figure may have other components than those depicted. Further, the embodiment shown in the figure is only one example of a cloud infrastructure system that may incorporate an embodiment of the invention. In some other embodiments, cloud infrastructure system 2302 may have more or fewer components than shown in the figure, may combine two or more components, or may have a different configuration or arrangement of components.

Client computing devices 2304, 2306, and 2308 may be devices similar to those described above for 2202, 2204, 2206, and 2208.

Although exemplary system environment 2300 is shown with three client computing devices, any number of client computing devices may be supported. Other devices such as devices with sensors, etc. may interact with cloud infrastructure system 2302.

Network(s) 2310 may facilitate communications and exchange of data between clients 2304, 2306, and 2308 and cloud infrastructure system 2302. Each network may be any type of network familiar to those skilled in the art that can support data communications using any of a variety of commercially-available protocols, including those described above for network(s) 2210.

Cloud infrastructure system 2302 may comprise one or more computers and/or servers that may include those described above for server 2212.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 2302 may be adapted to automatically provision, manage and track a customer's subscription to services offered by cloud infrastructure system 2302. Cloud infrastructure system 2302 may provide the cloud services via different deployment models. For example, services may be provided under a public cloud model in which cloud infrastructure system 2302 is owned by an organization selling cloud services (e.g., owned by Oracle) and the services are made available to the general public or different industry enterprises. As another example, services may be provided under a private cloud model in which cloud infrastructure system 2302 is operated solely for a single organization and may provide services for one or more entities within the organization. The cloud services may also be provided under a community cloud model in which cloud infrastructure system 2302 and the services provided by cloud infrastructure system 2302 are shared by several organizations in a related community. The cloud services may also be provided under a hybrid cloud model, which is a combination of two or more different models.

In some embodiments, the services provided by cloud infrastructure system 2302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2302. Cloud infrastructure system 2302 then performs processing to provide the services in the customer's subscription order.

In some embodiments, the services provided by cloud infrastructure system 2302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2302 may also include infrastructure resources 2330 for providing the resources used to provide various services to customers of the cloud infrastructure system. In one embodiment, infrastructure resources 2330 may include pre-integrated and optimized combinations of hardware, such as servers, storage, and networking resources to execute the services provided by the PaaS platform and the SaaS platform.

In some embodiments, resources in cloud infrastructure system 2302 may be shared by multiple users and dynamically re-allocated per demand. Additionally, resources may be allocated to users in different time zones. For example, cloud infrastructure system 2330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2332 may be provided that are shared by different components or modules of cloud infrastructure system 2302 and by the services provided by cloud infrastructure system 2302. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 2302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 2302, and the like.

In one embodiment, as depicted in the figure, cloud management functionality may be provided by one or more modules, such as an order management module 2320, an order orchestration module 2322, an order provisioning module 2324, an order management and monitoring module 2326, and an identity management module 2328. These modules may include or be provided using one or more computers and/or servers, which may be general purpose computers, specialized server computers, server farms, server clusters, or any other appropriate arrangement and/or combination.

In exemplary operation 2334, a customer using a client device, such as client device 2304, 2306 or 2308, may interact with cloud infrastructure system 2302 by requesting one or more services provided by cloud infrastructure system 2302 and placing an order for a subscription for one or more services offered by cloud infrastructure system 2302. In certain embodiments, the customer may access a cloud User Interface (UI), cloud UI 2312, cloud UI 2314 and/or cloud UI 2316 and place a subscription order via these UIs. The order information received by cloud infrastructure system 2302 in response to the customer placing an order may include information identifying the customer and one or more services offered by the cloud infrastructure system 2302 that the customer intends to subscribe to.

After an order has been placed by the customer, the order information is received via the cloud UIs, 2312, 2314 and/or 2316.

At operation 2336, the order is stored in order database 2318. Order database 2318 can be one of several databases operated by cloud infrastructure system 2318 and operated in conjunction with other system elements.

At operation 2338, the order information is forwarded to an order management module 2320. In some instances, order management module 2320 may be configured to perform billing and accounting functions related to the order, such as verifying the order, and upon verification, booking the order.

At operation 2340, information regarding the order is communicated to an order orchestration module 2322. Order orchestration module 2322 may utilize the order information to orchestrate the provisioning of services and resources for the order placed by the customer. In some instances, order orchestration module 2322 may orchestrate the provisioning of resources to support the subscribed services using the services of order provisioning module 2324.

In certain embodiments, order orchestration module 2322 enables the management of business processes associated with each order and applies business logic to determine whether an order should proceed to provisioning. At operation 2342, upon receiving an order for a new subscription, order orchestration module 2322 sends a request to order provisioning module 2324 to allocate resources and configure those resources needed to fulfill the subscription order. Order provisioning module 2324 enables the allocation of resources for the services ordered by the customer. Order provisioning module 2324 provides a level of abstraction between the cloud services provided by cloud infrastructure system 2300 and the physical implementation layer that is used to provision the resources for providing the requested services. Order orchestration module 2322 may thus be isolated from implementation details, such as whether or not services and resources are actually provisioned on the fly or pre-provisioned and only allocated/assigned upon request.

At operation 2344, once the services and resources are provisioned, a notification of the provided service may be sent to customers on client devices 2304, 2306 and/or 2308 by order provisioning module 2324 of cloud infrastructure system 2302.

At operation 2346, the customer's subscription order may be managed and tracked by an order management and monitoring module 2326. In some instances, order management and monitoring module 2326 may be configured to collect usage statistics for the services in the subscription order, such as the amount of storage used, the amount data transferred, the number of users, and the amount of system up time and system down time.

In certain embodiments, cloud infrastructure system 2300 may include an identity management module 2328. Identity management module 2328 may be configured to provide identity services, such as access management and authorization services in cloud infrastructure system 2300. In some embodiments, identity management module 2328 may control information about customers who wish to utilize the services provided by cloud infrastructure system 2302. Such information can include information that authenticates the identities of such customers and information that describes which actions those customers are authorized to perform relative to various system resources (e.g., files, directories, applications, communication ports, memory segments, etc.) Identity management module 2328 may also include the management of descriptive information about each customer and about how and by whom that descriptive information can be accessed and modified.

Figure 24:
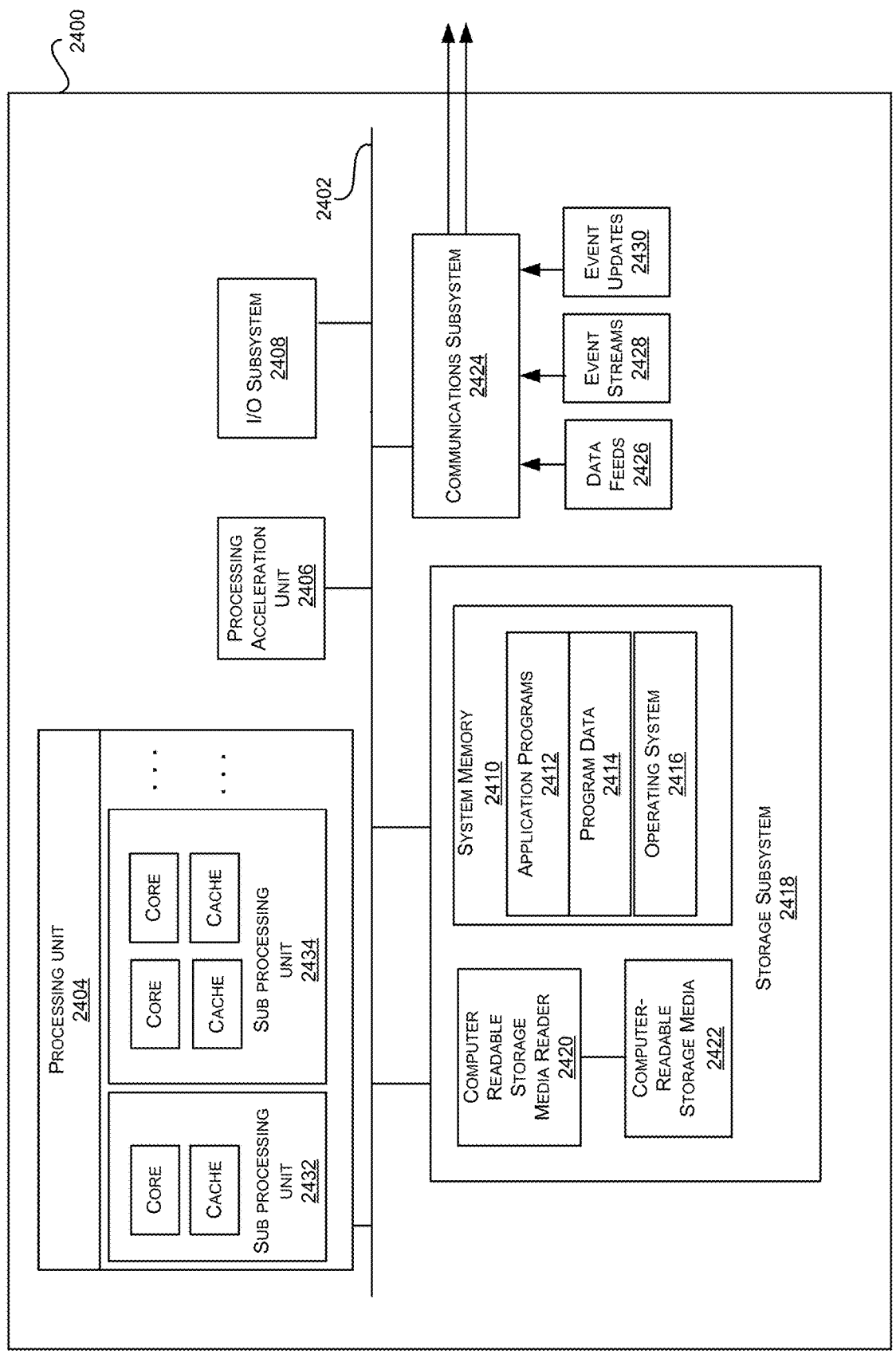
FIG. 24 illustrates an exemplary computer system, in which various embodiments may be implemented.

FIG. 24 illustrates an exemplary computer system 2400, in which various embodiments of the present invention may be implemented. The system 2400 may be used to implement any of the computer systems described above. As shown in the figure, computer system 2400 includes a processing unit 2404 that communicates with a number of peripheral subsystems via a bus subsystem 2402. These peripheral subsystems may include a processing acceleration unit 2406, an I/O subsystem 2408, a storage subsystem 2418 and a communications subsystem 2424. Storage subsystem 2418 includes tangible computer-readable storage media 2422 and a system memory 2410.

Bus subsystem 2402 provides a mechanism for letting the various components and subsystems of computer system 2400 communicate with each other as intended. Although bus subsystem 2402 is shown schematically as a single bus, alternative embodiments of the bus subsystem may utilize multiple buses. Bus subsystem 2402 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2404, which can be implemented as one or more integrated circuits (e.g., a conventional microprocessor or microcontroller), controls the operation of computer system 2400. One or more processors may be included in processing unit 2404. These processors may include single core or multicore processors. In certain embodiments, processing unit 2404 may be implemented as one or more independent processing units 2432 and/or 2434 with single or multicore processors included in each processing unit. In other embodiments, processing unit 2404 may also be implemented as a quad-core processing unit formed by integrating two dual-core processors into a single chip.

In various embodiments, processing unit 2404 can execute a variety of programs in response to program code and can maintain multiple concurrently executing programs or processes. At any given time, some or all of the program code to be executed can be resident in processor(s) 2404 and/or in storage subsystem 2418. Through suitable programming, processor(s) 2404 can provide various functionalities described above. Computer system 2400 may additionally include a processing acceleration unit 2406, which can include a digital signal processor (DSP), a special-purpose processor, and/or the like.

I/O subsystem 2408 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2400 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2400 may comprise a storage subsystem 2418 that comprises software elements, shown as being currently located within a system memory 2410. System memory 2410 may store program instructions that are loadable and executable on processing unit 2404, as well as data generated during the execution of these programs.

Depending on the configuration and type of computer system 2400, system memory 2410 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2404. In some implementations, system memory 2410 may include multiple different types of memory, such as static random access memory (SRAM) or dynamic random access memory (DRAM). In some implementations, a basic input/output system (BIOS), containing the basic routines that help to transfer information between elements within computer system 2400, such as during start-up, may typically be stored in the ROM. By way of example, and not limitation, system memory 2410 also illustrates application programs 2412, which may include client applications, Web browsers, mid-tier applications, relational database management systems (RDBMS), etc., program data 2414, and an operating system 2416. By way of example, operating system 2416 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 2418 may also provide a tangible computer-readable storage medium for storing the basic programming and data constructs that provide the functionality of some embodiments. Software (programs, code modules, instructions) that when executed by a processor provide the functionality described above may be stored in storage subsystem 2418. These software modules or instructions may be executed by processing unit 2404. Storage subsystem 2418 may also provide a repository for storing data used in accordance with the present invention.

Storage subsystem 2400 may also include a computer-readable storage media reader 2420 that can further be connected to computer-readable storage media 2422. Together and, optionally, in combination with system memory 2410, computer-readable storage media 2422 may comprehensively represent remote, local, fixed, and/or removable storage devices plus storage media for temporarily and/or more permanently containing, storing, transmitting, and retrieving computer-readable information.

Computer-readable storage media 2422 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2400.

By way of example, computer-readable storage media 2422 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2422 may include, but is not limited to, Zip® drives, flash memory cards, universal serial bus (USB) flash drives, secure digital (SD) cards, DVD disks, digital video tape, and the like. Computer-readable storage media 2422 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2400.

Communications subsystem 2424 provides an interface to other computer systems and networks. Communications subsystem 2424 serves as an interface for receiving data from and transmitting data to other systems from computer system 2400. For example, communications subsystem 2424 may enable computer system 2400 to connect to one or more devices via the Internet. In some embodiments communications subsystem 2424 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2424 can provide wired network connectivity (e.g., Ethernet) in addition to or instead of a wireless interface.

In some embodiments, communications subsystem 2424 may also receive input communication in the form of structured and/or unstructured data feeds 2426, event streams 2428, event updates 2430, and the like on behalf of one or more users who may use computer system 2400.

By way of example, communications subsystem 2424 may be configured to receive data feeds 2426 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2424 may also be configured to receive data in the form of continuous data streams, which may include event streams 2428 of real-time events and/or event updates 2430, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2424 may also be configured to output the structured and/or unstructured data feeds 2426, event streams 2428, event updates 2430, and the like to one or more databases that may be in communication with one or more streaming data source computers coupled to computer system 2400.

Computer system 2400 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2400 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method of customizing deployment and operation of services in container environments, the method comprising:
   receiving, at an API registry, an API definition comprising:
      an endpoint of a service that is or will be encapsulated in a container that is or will be deployed in a container environment; and
      one or more API functions associated with the service;
   receiving, at the API registry, a property for the service, wherein the property for the service is received with the API definition;
   determining, by the API registry, that the property for the service affects the deployment of the service to the container environment;
   in response to determining that the property affects the deployment of the service, deploying the service based at least in part on the property.

2. The method of claim 1, wherein the property comprises code that is executed by the API registry.

3. The method of claim 1, wherein the property comprises flags that are used by the API registry to select predefined processes to execute.

4. The method of claim 1, wherein determining, by the API registry, whether the property for the service affects the deployment of the service to the container environment comprises:
   determining that the property indicates that the service should be deployed to the container environment such that it has high availability.

5. The method of claim 4, wherein deploying the service based at least in part on the property comprises:
   deploying multiple containerized instances of the service to the container environment.

6. The method of claim 1, wherein the container environment comprises a plurality of services encapsulated in containers.

7. The method of claim 1, wherein the API registry is deployed as a service encapsulated in a container in the container environment.

8. A non-transitory computer-readable medium comprising instructions that, when executed by one or more processors, causes the one or more processors to perform operations comprising:
   receiving, at an API registry, an API definition comprising:
      an endpoint of a service that is or will be encapsulated in a container that is or will be deployed in a container environment; and
      one or more API functions associated with the service;
   receiving, at the API registry, a property for the service, wherein the property for the service is received with the API definition;
   determining, by the API registry, that the property for the service affects the generation of a client library that calls the service in the container environment; and
   in response to determining that the property affects the generation of the client library, generating the client library based at least in part on the property.

9. The non-transitory computer-readable medium of claim 8, wherein determining whether the property for the service affects the generation of the client library that calls the service in the container environment comprises:
   determining that the property indicates that the service requires end-to-end encryption.

10. The non-transitory computer-readable medium of claim 9, wherein generating the client library based at least in part on the property comprises:
    generating code in the client library that encrypts data before it is sent in a service call to an endpoint of the service.

11. The non-transitory computer-readable medium of claim 8, wherein determining whether the property for the service affects the generation of the client library that calls the service in the container environment comprises:
    determining that the property indicates that calling services should log usage of the service.

12. The non-transitory computer-readable medium of claim 11, wherein generating the client library based at least in part on the property comprises:
    generating code in the client library that logs usage information for calls to an endpoint of the service.

13. The non-transitory computer-readable medium of claim 8, wherein the client library comprises an object class with member functions that implement the API functions to make direct calls to an endpoint of the service.

14. The non-transitory computer-readable medium of claim 8, wherein the API registry is available to:
    services in development in an Integrated Development Environment (IDE); and
    services already deployed in the container environment.

15. A system comprising:
    one or more processors; and
    one or more memory devices comprising instructions that, when executed by the one or more processors, cause the one or more processors to perform operations comprising:

receiving, at an API registry, an API definition comprising:
- an endpoint of a service that is or will be encapsulated in a container that is or will be deployed in a container environment; and
- one or more API functions associated with the service;

receiving, at the API registry, a property for the service, wherein the property for the service is received with the API definition;

determining, by the API registry, that the property for the service affects how calls to the service are handled in the container environment; and in response to determining that the property affects how the calls to the service are handled, handling the calls to the service based at least in part on the property.

16. The system of claim 15, wherein determining whether the property for the service affects how the calls to the service are handled in the container environment comprises:
determining that the property indicates that the service should be instantiated on-demand in the container environment.

17. The system of claim 16, wherein handling the calls to the service based at least in part on the property comprises:
generating, by the API registry, a containerized instance of the service in response to receiving an indication that a calling service will send a request to the service.

18. The system of claim 15, wherein determining whether the property for the service affects how the calls to the service are handled in the container environment comprises:
determining that the property indicates that the service should be rate-limited 4 when calls are made to the service in the container environment.

19. The system of claim 15, wherein the property comprises:
- code that is executed by the API registry; or
- flags that are used by the API registry to select predefined processes to execute.

20. The system of claim 15, further comprising generating, by the API registry, a client library comprising code that directly calls the endpoint of the service.

* * * * *

UNITED STATES PATENT AND TRADEMARK OFFICE
CERTIFICATE OF CORRECTION

PATENT NO. : 11,681,573 B2  Page 1 of 2
APPLICATION NO. : 16/827090
DATED : June 20, 2023
INVENTOR(S) : Caldato et al.

It is certified that error appears in the above-identified patent and that said Letters Patent is hereby corrected as shown below:

On the Title Page

On Page 3 Column 1 (Other Publications), Line 12, Delete "platfomi/" and insert -- platform/ --.

On Page 3 Column 1 (Other Publications), Line 57, Delete "Markolnsights," and insert -- MarkoInsights, --.

In the Specification

In Column 6, Line 67, Delete "makefiles" and insert -- make files --.

In Column 7, Line 38-39, Delete "architetures." and insert -- architectures. --.

In Column 12, Line 48, Delete "GetUser( ) AddUser( ) RemoveUser( ) and UpdateUser( )" and insert -- GetUser( ), AddUser( ), RemoveUser( ), and UpdateUser( ). --.

In Column 14, Line 21, Delete "CreateUser( ))" and insert -- CreateUser( ) --.

In Column 14, Line 24, Delete "CreateUser( ))" and insert -- CreateUser( ) --.

In Column 15, Line 30, Delete "CreateUser( ))" and insert -- CreateUser( ) --.

In Column 15, Line 34, Delete "CreateUser( ))" and insert -- CreateUser( ) --.

In Column 15, Line 56, Delete "CreateUser( ))" and insert -- CreateUser( ) --.

In Column 16, Line 3, Delete "CreateUser( ))" and insert -- CreateUser( ) --.

In Column 17, Line 8, Delete "CreateUser( ))" and insert -- CreateUser( ) --.

Signed and Sealed this
Second Day of April, 2024

Katherine Kelly Vidal
*Director of the United States Patent and Trademark Office*

In Column 22, Line 19, Delete "CreateInstance( ))" and insert -- CreateInstance( ) --.

In the Claims

In Column 38, Line 10, In Claim 18, delete "rate-limited 4" and insert -- rate-limited --.